US010129698B2

(12) United States Patent
Gillen et al.

(10) Patent No.: US 10,129,698 B2
(45) Date of Patent: Nov. 13, 2018

(54) INTERNAL LOCATION ADDRESS AND AUTOMATIC ROUTING OF INTRA-FACILITY MOVEMENT

(71) Applicant: United Parcel Service of America, Inc., Atlanta, GA (US)

(72) Inventors: Robert J. Gillen, Alpharetta, GA (US); Paul H. Bonin, Dunwoody, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 15/378,515

(22) Filed: Dec. 14, 2016

(65) Prior Publication Data

US 2018/0020326 A1 Jan. 18, 2018

Related U.S. Application Data

(60) Provisional application No. 62/362,405, filed on Jul. 14, 2016, provisional application No. 62/362,395, filed on Jul. 14, 2016.

(51) Int. Cl.
*H04W 24/00* (2009.01)
*H04W 4/02* (2018.01)
(Continued)

(52) U.S. Cl.
CPC .......... *H04W 4/023* (2013.01); *G01C 21/206* (2013.01); *G08G 1/005* (2013.01); *H04W 4/027* (2013.01);
(Continued)

(58) Field of Classification Search
CPC .......................................... H04W 4/00–4/206
See application file for complete search history.

(56) References Cited

U.S. PATENT DOCUMENTS 5,959,575 A 9/1999 Abbott
6,323,807 B1 11/2001 Golding et al.
(Continued)

FOREIGN PATENT DOCUMENTS

EP 1847954 A1 10/2007
WO 2006/015399 A1 2/2006

OTHER PUBLICATIONS

Amadeo, Ron, "Gear & Gadgets—Google's Eddystone beacons offer a privacy-focused way to track your stuff", *ars TECHNICA*, Apr. 14, 2016, 3 pages, retrieved from <http://arstechnica.com/gadgets/2016/04/googles-eddystone-beacons-offer-a-privacy-focused-way-to-track-your-stuff/> on Dec. 16, 2016.
(Continued)

*Primary Examiner* — San Htun
(74) *Attorney, Agent, or Firm* — Shook, Hardy & Bacon L.L.P.

(57) ABSTRACT

Various embodiments are directed to systems and methods for facilitating movement within a facility by providing internal navigation instructions to a user, and/or for automatically operating various transportation mechanisms within the facility to move the user therein. Various embodiments thus comprise a computing entity configured to receive location information/data indicative of a current location of a user and destination information/data indicative of a desired destination for the user, generate a recommended route for the user, and transmit one or more signals to location devices along the recommended route to provide navigations cues to the user, or to one or more transportation mechanisms to enable the user to board the transportation mechanism at a first location, and disembark the transportation mechanism closer to the desired destination.

18 Claims, 7 Drawing Sheets

(51) Int. Cl.
*H04W 64/00* (2009.01)
*G01C 21/20* (2006.01)
*H04W 4/04* (2009.01)
*G08G 1/005* (2006.01)
*H04W 4/80* (2018.01)
*H04W 84/12* (2009.01)
*G01S 19/48* (2010.01)

(52) U.S. Cl.
CPC .......... *H04W 4/046* (2013.01); *H04W 4/80* (2018.02); *H04W 64/006* (2013.01); *G01S 19/48* (2013.01); *H04W 84/12* (2013.01)

(56) References Cited

U.S. PATENT DOCUMENTS

| | | |
|---|---|---|
| 7,505,849 B2 | 3/2009 | Saarikivi |
| 7,587,274 B2 | 9/2009 | Kaldewey et al. |
| 7,991,382 B1 | 8/2011 | Gunasekara |
| 7,991,576 B2 | 8/2011 | Roumeliotis |
| 8,009,013 B1 | 8/2011 | Hirschfeld et al. |
| 8,022,875 B2 | 9/2011 | Huang et al. |
| 8,022,876 B2 | 9/2011 | Huang et al. |
| 8,117,006 B2 | 2/2012 | Lee et al. |
| 8,155,872 B2 | 4/2012 | Kjeldsen et al. |
| 8,174,439 B2 | 5/2012 | Torimoto et al. |
| 8,174,931 B2 | 5/2012 | Vartanian et al. |
| 8,284,100 B2 | 10/2012 | Vartanian et al. |
| 8,346,472 B2 | 1/2013 | Kaldewey et al. |
| 8,352,176 B2 | 1/2013 | Kaldewey et al. |
| 8,395,968 B2 | 3/2013 | Vartanian et al. |
| 8,400,359 B2 | 3/2013 | Liu et al. |
| 8,437,954 B1 | 5/2013 | Freeman et al. |
| 8,442,483 B2 | 5/2013 | Gunasekara |
| 8,498,811 B2 | 7/2013 | Lundquist et al. |
| 8,510,033 B2 | 8/2013 | Park et al. |
| 8,538,687 B2 | 9/2013 | Plocher et al. |
| 8,538,688 B2 | 9/2013 | Prehofer |
| 8,548,494 B2 | 10/2013 | Agarwal et al. |
| 8,548,497 B2 | 10/2013 | Lymberopoulos et al. |
| 8,565,783 B2 | 10/2013 | Yang et al. |
| 8,583,400 B2 | 11/2013 | Thrun et al. |
| 8,588,097 B1 | 11/2013 | Ogale et al. |
| 8,599,758 B1 | 12/2013 | Ogale et al. |
| 8,624,725 B1* | 1/2014 | MacGregor ........... H04W 4/026 340/539.13 |
| 8,639,264 B2 | 1/2014 | Valletta et al. |
| 8,660,581 B2 | 2/2014 | Davis et al. |
| 8,666,432 B2 | 3/2014 | Gold et al. |
| 8,812,234 B2 | 8/2014 | Castaneda |
| 8,836,580 B2 | 9/2014 | Mendelson |
| 8,862,400 B2 | 10/2014 | Kelly |
| 8,866,673 B2 | 10/2014 | Mendelson |
| 8,891,503 B2 | 11/2014 | Shinozaki |
| 8,941,485 B1 | 1/2015 | Mendelson |
| 9,052,206 B2 | 6/2015 | Li et al. |
| 9,055,451 B2 | 6/2015 | Kim et al. |
| 9,063,212 B2 | 6/2015 | Jones, Jr. |
| 9,064,398 B2 | 6/2015 | Davis et al. |
| 9,081,079 B2 | 7/2015 | Chao et al. |
| 9,103,916 B2 | 8/2015 | Waters et al. |
| 9,110,159 B2 | 8/2015 | Vartanian et al. |
| 9,113,309 B2 | 8/2015 | Uilecan et al. |
| 9,164,164 B2 | 10/2015 | Baechler et al. |
| 9,173,067 B2 | 10/2015 | Aggarwal et al. |
| 9,176,230 B2 | 11/2015 | Vartanian et al. |
| 9,179,279 B2 | 11/2015 | Zussman |
| 9,182,494 B2 | 11/2015 | Vartanian et al. |
| 9,204,251 B1 | 12/2015 | Mendelson |
| 9,204,257 B1 | 12/2015 | Mendelson |
| 9,204,259 B2 | 12/2015 | Ogale et al. |
| 9,210,543 B2 | 12/2015 | Shin et al. |
| 9,212,916 B2 | 12/2015 | Moosavi et al. |
| 9,250,084 B2 | 2/2016 | Shaffer et al. |
| 9,258,681 B2 | 2/2016 | Ogale et al. |
| 9,264,860 B2 | 2/2016 | Wu et al. |
| 9,267,801 B2 | 2/2016 | Gupta et al. |
| 9,277,357 B2 | 3/2016 | Ling |
| 9,279,686 B2 | 3/2016 | Tuo et al. |
| 9,288,634 B2 | 3/2016 | Keerthi |
| 9,291,460 B2 | 3/2016 | Ettinger et al. |
| 9,301,100 B1 | 3/2016 | Jampani et al. |
| 9,307,366 B2 | 4/2016 | Rochberger et al. |
| 9,310,462 B2 | 4/2016 | Chintalapudi et al. |
| 9,316,503 B2 | 4/2016 | Zhang et al. |
| 2006/0293839 A1 | 12/2006 | Stankiewicz et al. |
| 2007/0198174 A1 | 8/2007 | Williams et al. |
| 2008/0281515 A1* | 11/2008 | Ann .................. G01C 21/20 701/434 |
| 2009/0157309 A1* | 6/2009 | Won .................. G01C 21/20 701/533 |
| 2010/0057592 A1 | 3/2010 | Moir et al. |
| 2011/0148623 A1 | 6/2011 | Bishop et al. |
| 2011/0153201 A1* | 6/2011 | Park .................. G01C 21/20 701/533 |
| 2011/0176803 A1 | 7/2011 | Song et al. |
| 2011/0184945 A1 | 7/2011 | Das et al. |
| 2011/0251787 A1 | 10/2011 | Gupta et al. |
| 2012/0072106 A1 | 3/2012 | Han et al. |
| 2012/0130762 A1* | 5/2012 | Gale .................. G01C 21/20 705/7.13 |
| 2012/0143495 A1 | 6/2012 | Dantu |
| 2012/0158297 A1 | 6/2012 | Kim et al. |
| 2013/0065604 A1 | 3/2013 | Werner et al. |
| 2013/0138342 A1 | 5/2013 | Zaid et al. |
| 2013/0166193 A1 | 6/2013 | Goldman et al. |
| 2013/0211718 A1 | 8/2013 | Yoo et al. |
| 2013/0245942 A1 | 9/2013 | Ure |
| 2013/0262223 A1 | 10/2013 | Catane et al. |
| 2013/0297205 A1 | 11/2013 | Kim et al. |
| 2014/0122017 A1 | 5/2014 | Chu |
| 2014/0163868 A1* | 6/2014 | Huang ............... G01C 21/206 701/425 |
| 2014/0236475 A1* | 8/2014 | Venkatraman ....... G01C 21/206 701/420 |
| 2014/0240350 A1 | 8/2014 | Chen |
| 2014/0257687 A1 | 9/2014 | Chen et al. |
| 2014/0274119 A1 | 9/2014 | Venkatraman et al. |
| 2014/0285631 A1 | 9/2014 | Janky et al. |
| 2014/0320641 A1 | 10/2014 | Kulik |
| 2014/0343843 A1* | 11/2014 | Yanku .................. G01C 21/26 701/491 |
| 2014/0343846 A1 | 11/2014 | Goldman et al. |
| 2014/0357295 A1 | 12/2014 | Skomra et al. |
| 2015/0039226 A1 | 2/2015 | Ghose et al. |
| 2015/0051994 A1 | 2/2015 | Ward et al. |
| 2015/0061938 A1 | 3/2015 | Moraleda et al. |
| 2015/0153160 A1 | 6/2015 | James |
| 2015/0153181 A1 | 6/2015 | Gildfind et al. |
| 2015/0160018 A1 | 6/2015 | Ameling et al. |
| 2015/0168159 A1 | 6/2015 | Chao et al. |
| 2015/0215744 A1 | 7/2015 | Kuti et al. |
| 2015/0230322 A1 | 8/2015 | Kim et al. |
| 2015/0237480 A1 | 8/2015 | Fang et al. |
| 2015/0247916 A1 | 9/2015 | Bartov et al. |
| 2015/0257014 A1 | 9/2015 | Ahmed et al. |
| 2015/0289111 A1 | 10/2015 | Ozkan |
| 2015/0378001 A1 | 12/2015 | Inoue et al. |
| 2016/0084646 A1 | 3/2016 | Chen |
| 2016/0103201 A1 | 4/2016 | Lee |
| 2016/0112845 A1 | 4/2016 | Luo et al. |

OTHER PUBLICATIONS

Ask, J. A., et al., "Make Smart Wireless Location Technology Decisions: Hint: Beacons Aren't Always The Answer" *Forrester*, Jun. 8, 2016, 19 pages, Forrester Research, Inc., U.S.A.

Conger, Kate, "Uber begins background collection of rider location data", *Crunch Network*, Nov. 28, 2016, 9 pages, retrieved from <http://social.techcrunch.com/2016/11/28/uber-background-location-data-collection/> on Dec. 16, 2016.

(56) References Cited

OTHER PUBLICATIONS

Gillett, Frank E., "Brief: The Two Fundamental IoT Business Opportunities: CIOs Need To Help Their Business Partners Focus on the Right IoT Value Scenarios", *Forrester*, Jan. 25, 2016, 10 pages, Forrester Research, Inc., U.S.A.

Janmohamed, Arif, "After decades of dreaming, indoor location's time has come", *Crunch Network*, Nov. 19, 2016, 9 pages, retrieved from <http://social.techcrunch.com/2016/11/19/after-decades-of-dreaming-indoor-locations-time-has-come/> on Dec. 16, 2016.

Long, Danielle, "Beyond Marketing: How Beacons Can Be Used to Solve Problems", *The Digital Product Firm | Skookum*, Jul. 6, 2016, 5 pages, retrieved from <http://skookum.com/blog/Beyond_Marketing_How_Beacons_Can_Be_Used_to_Solve_Problems> on Dec. 16, 2016.

Martin, Chase, "Smart Lights in Stores Match Shoppers With Products", *IOT Daily*, Jul. 4, 2016, 3 pages, retrieved from <http://www.mediapost.com/publications/article/279550/smart-lights-in-stores-match-shoppers-with-product.html> on Dec. 15, 2016.

SSI Staff, "HID Global Acquires Bluvision to Expand Bluetooth Solutions", *Security Sales & Integration*, Dec. 2, 2016, 4 pages, retrieved from <http://www.securitysales.com/article/hid_global_acquires_bluvision_to_expand_blu etooth_solutions> on Dec. 16, 2016.

Stackexchange Blog (Protected by Rory Alsop), "How does Google know Where I am?", *Information Security Stack Exchange*, Sep. 21, 2016, 5 pages, retrieved from <http://security.stackexchange.com/questions/137418/how-does-google-know-where-i-am> on Dec. 16, 2016.

Supeala, Doru, "7 major trends for BLE Beacons in 2016", *Onyx Beacon*, Feb. 2, 2016, 6 pages, retrieved from <http://www.onyxbeacon.com/7-major-trends-for-ble-beacons-in-2016/> on Dec. 16, 2016.

Wise, Jennifer, "Brief: Tap Your Consumers' Location For Mobile Marketing Success: Master Location-Based Marketing to Amplify Acquisition and Conversion", *Forrester*, Aug. 24, 2016, 10 pages, Forrester Research, Inc, U.S.A.

Non-Final Rejection dated Sep. 22, 2017 for U.S. Appl. No. 15/378,876.

ISA/206—Invitation to Pay Additional Fees dated Sep. 14, 2017 for WO Application No. PCT/US17/037646.

Indoor Navigation, insoft GMbH, Jul. 29, 2016 to Jun. 6, 2017, Internet Archive, 7 pages, https://web.archive.org/web/*/https://www.infsoft.com/solutions/indoor-navigation, Oct. 13, 2017, Best Available: 2017.

Apple Could Guide You Around Your City Using Augmented Reality, Aug. 16, 2017, Romain Dillet, TechCrunch, 7 pages, https://techcrunch.com/2017/08/16/apple-could-guide-you-around-your-city-using-augmented-reality/, Oct. 13, 2017, Best Available Date: Aug. 16, 2017.

ISA/220—Notification of Transmittal or Search Report and Written Opinion of the ISA, or the Declaration dated Nov. 29, 2017 for WO Application No. PCT/US17/037646.

Final Office Action received for U.S. Appl. No. 15/378,876, dated Apr. 4, 2018, 13 pages.

Notice of Allowance received for U.S. Appl. No. 15/378,876, dated Jul. 30, 2018, 9 pages.

\* cited by examiner

INTERNAL LOCATION ADDRESS AND AUTOMATIC ROUTING OF INTRA-FACILITY MOVEMENT

CROSS-REFERENCE TO RELATED APPLICATIONS

This patent application claims priority from U.S. Provisional Application Ser. No. 62/362,405, filed Jul. 14, 2016 and U.S. Provisional Application Ser. No. 62/362,395, filed Jul. 14, 2016, each of which are incorporated herein by reference in their entirety.

BACKGROUND

At present, various concepts enable specific indications for various addresses that enable the generation of predictive routing to various locations along known travel paths. However, such concepts merely facilitate travel to a particular outdoor address, such as the address of a specific building, campus, and/or the like. In instances in which a visitor (e.g., service personnel, delivery personnel, maintenance personnel, and/or the like), resident, visually impaired individual, and/or the like is scheduled to visit a specific location and/or individual within a building, campus, and/or the like, however, the visitor must manually determine a route to the desired destination location based on limited and potentially outdated information/data provided via a static building directory, based on the instructions of a receptionist, security guard, or other building personnel, and/or the like.

Accordingly, a need exists for accurate, internal location addressing and routing concepts enabling visitors to quickly locate a desired internal destination in order to facilitate navigation within locations.

BRIEF SUMMARY

Various embodiments are directed to systems for providing internal navigation instructions for a mobile device user. Various embodiments comprise a computing entity (e.g., a mobile computing entity and/or a mapping computing entity) and one or more location devices. The computing entity may be configured to receive location information/data indicative of a current location of a user; receive destination information/data indicative of a desired destination for the user; generate a recommended route between the current location of the user and the desired destination for the user; and transmit one or more signals indicative of the recommended route for example, to the location devices. In certain embodiments, the location devices may be positioned between the current location of the user and the desired destination for the user. In various embodiments, each of the plurality of location devices are configured to receive one or more of the transmitted signals from the computing entity; and emit a navigational cue indicative of at least a portion of the recommended route to the user. In various embodiments, the navigational cue is selected from at least one of one or more illuminated lights indicating a direction of travel along the recommended route; or a sound indicating a direction of travel along the recommended route. In various embodiments, one or more of the location devices may be integrated into one or more light fixtures.

In various embodiments, receiving location information/data may comprise receiving location information/data broadcast from a location device indicative of a current location of the location device. Moreover, in certain embodiments, receiving destination information/data comprises at least one of: (i) receiving user input indicative of the desired destination data; (ii) receiving information/data from an item indicative of a delivery location for the item; or (iii) receiving information/data indicative of the location of an appointment for the user.

In embodiments in which the computing entity is a mapping computing entity, receiving location information/data may comprise receiving information/data indicative of a current location of a mobile computing entity associated with the user; and receiving destination information/data may comprise receiving information/data indicative of a desired destination for the user from the mobile computing entity associated with the user.

In various embodiments, each of the plurality of location devices are associated with a respective location, and the location information/data is generated by comparing the current location of the user against the respective locations of one or more of the location devices. Moreover, in certain embodiments, each of the plurality of location devices are configured to broadcast information/data indicative of their location, and a mobile device is configured to receive broadcast information/data from one or more location devices and to generate the location information/data based on the received broadcast data.

Moreover, in certain embodiments, transmitting the one or more signals indicative of the recommended route comprises transmitting the one or more signals to a subset of the plurality of location devices, wherein the subset of the plurality of location devices are identified based at least in part on the location data.

Various embodiments are directed to methods for providing internal navigation instructions, for example, to one or more mobile device users. In various embodiments, the method comprises steps for: receiving, at a computing entity (e.g., a mobile computing entity and/or a mapping computing entity), location information/data indicative of a current location of a user; receiving, at the computing entity, destination information/data indicative of a desired destination for the user; generating, via the computing entity, a recommended route between the current location of the user and the desired destination for the user; transmitting, from the computing entity, one or more signals indicative of the recommended route to one or more of a plurality of location devices, wherein the location devices are positioned between the current location of the user and the desired destination of the user; and causing one or more of the location devices to emit a navigational cue indicative of at least a portion of the recommended route to the user. In various embodiments, the navigational cue is selected from at least one of one or more illuminated lights indicating a direction of travel along the recommended route; or a sound indicating a direction of travel along the recommended route. In various embodiments, one or more of the location devices may be integrated into one or more light fixtures.

Moreover, certain embodiments are directed to a computer program product comprising at least one non-transitory computer-readable storage medium having computer-readable program code portions stored therein. In various embodiments, the computer-readable program code portions comprise: an executable portion configured to receive location information/data indicative of a current location of a user; an executable portion configured to receive destination information/data indicative of a desired destination for the user; an executable portion configured to generate a recommended route between the current location of the user and the desired destination for the user; and an executable portion configured to transmit one or more signals indicative of the recommended route to one or more of a plurality of location devices, wherein the location devices are positioned between the current location of the user and the desired destination of the user; and an executable portion configured to cause one or more of the location devices to emit a navigational cue indicative of at least a portion of the recommended route to the user.

Moreover, certain embodiments are directed to transportation mechanism operational systems for enabling remote operation of a transportation mechanism. In various embodiments, the system comprises a computing entity in communication with at least one transportation mechanism, the computing entity comprising one or more non-transitory memory storage areas and one or more processors. In certain embodiments, the computing entity is configured to: receive location information/data indicative of a current location of a mobile device (e.g., a mobile computing entity and/or a connected shipment/item) associated with a user; receive destination information/data indicative of a desired destination associated with the mobile device; transmit a first signal to the at least one transportation mechanism, wherein the first signal causes the transportation mechanism to enable the user and the mobile device to board the transportation mechanism at the current location; upon determining that the mobile device is onboard the transportation mechanism, transmit a second signal causing the transportation mechanism to move the user and the mobile device to the desired destination.

In various embodiments, the current location of the mobile device is one of a plurality of levels within a facility. Moreover, in various embodiments, the desired destination is one of a plurality of levels within a facility. In certain embodiments, the transportation mechanism is selected from: an elevator, a horizontal people mover, and/or the like.

In certain embodiments, the computing entity of the transportation mechanism is further configured to: receive information/data indicative of a recommended route from a first location within a facility to a second location within the facility, wherein the recommended route comprises information/data identifying the current location of the mobile device and the desired destination associated the mobile device, and wherein at least a portion of the recommended route between the first location and the second location utilizes at least one transportation mechanism; determine, based on dynamic information/data indicative of the mobile device movement along the recommended route, a first estimated time at which the mobile device will reach the transportation mechanism at the current location of the mobile device; and transmit the first signal to the at least one transportation mechanism to cause the transportation mechanism to enable the user and the mobile device to board the transportation mechanism at approximately the first estimated time.

Yet other embodiments are directed to a method for remotely operating a transportation mechanism. In certain embodiments, the method comprises steps for: receiving, via a computing entity, location information/data indicative of a current location of a mobile device associated with a user; receiving, via the computing entity, destination information/data indicative of a desired destination associated with the mobile device; transmitting, from the computing entity, a first signal to the at least one transportation mechanism, wherein the first signal causes the transportation mechanism to enable the user and the mobile device to board the transportation mechanism at the current location; upon determining that the mobile device is onboard the transportation mechanism, transmitting, from the computing entity, a second signal causing the transportation mechanism to move the user and the mobile device to the desired destination.

In certain embodiments, the method additionally comprises steps for: receiving information/data indicative of a recommended route from a first location within a facility to a second location within the facility, wherein the recommended route comprises information/data identifying the current location of the mobile device and the desired destination associated the mobile device, and wherein at least a portion of the recommended route between the first location and the second location utilizes at least one transportation mechanism; determining, based on dynamic information/data indicative of the mobile device movement along the recommended route, a first estimated time at which the mobile device will reach the transportation mechanism at the current location of the mobile device; and transmitting the first signal to the at least one transportation mechanism to cause the transportation mechanism to enable the user and the mobile device to board the transportation mechanism at approximately the first estimated time.

Certain embodiments are directed to a computer program product comprising at least one non-transitory computer-readable storage medium having computer-readable program code portions stored therein. In various embodiments, the computer-readable program code portions comprises: an executable portion configured to receive location information/data indicative of a current location of a mobile device associated with a user; an executable portion configured to receive destination information/data indicative of a desired destination associated with the mobile device; an executable portion configured to transmit a first signal to the at least one transportation mechanism, wherein the first signal causes the transportation mechanism to enable the user and the mobile device to board the transportation mechanism at the current location; an executable portion configured to, upon determining that the mobile device is onboard the transportation mechanism, transmit, from the computing entity, a second signal causing the transportation mechanism to move the user and the mobile device to the desired destination.

Moreover, in certain embodiments, the computer-readable program code portions further comprise: an executable portion configured to receive information/data indicative of a recommended route from a first location within a facility to a second location within the facility, wherein the recommended route comprises information/data identifying the current location of the mobile device and the desired destination associated the mobile device, and wherein at least a portion of the recommended route between the first location and the second location utilizes at least one transportation mechanism; an executable portion configured to determine, based on dynamic information/data indicative of the mobile device movement along the recommended route, a first estimated time at which the mobile device will reach the transportation mechanism at the current location of the mobile device; and an executable portion configured to transmit the first signal to the at least one transportation mechanism to cause the transportation mechanism to enable the user and the mobile device to board the transportation mechanism at approximately the first estimated time.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
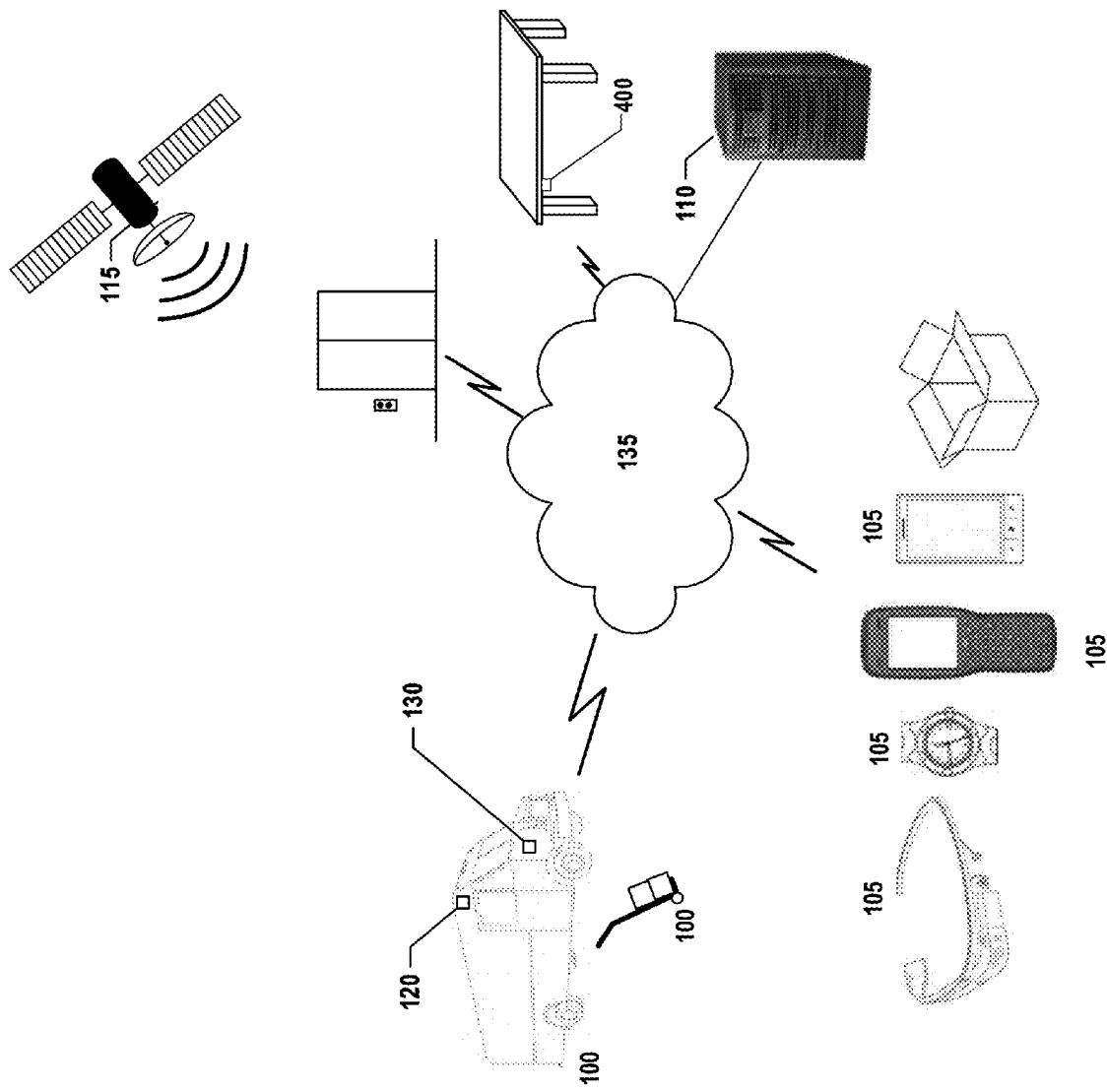
FIG. 1 is a diagram of a system that can be used to practice various embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to concepts for providing internal addresses within a facility (e.g., a building, a campus, a suite, a house, an apartment, a warehouse, a building complex, a mall, and/or the like). The internal addresses may facilitate locating specific individuals, rooms, furniture (e.g., desks), and/or other locations within the facility. The internal addresses may be associated with one or more location devices (e.g., location beacons, Internet of Things enabled devices, and/or the like), which may be configured to wirelessly broadcast information/data indicative of the location device's location to any mobile devices within a corresponding broadcast range. In certain embodiments, the location devices may also be configured to receive information/data indicative of a desired destination of a particular mobile device user (e.g., transmitted from a mobile device carried by the mobile device user, such as a mobile computing entity carried by the user), and may provide navigational instructions to direct the mobile device user toward the desired destination. For example, location devices may be located along walkways within a facility and at various internal addresses within the facility. As a mobile device user moves along the various walkways within the facility, location devices located along a recommended navigational path leading toward a desired destination may provide navigational cues indicative of the navigational instructions for the mobile device user. For example, illuminate associated lights in order to direct the mobile device user toward the desired destination.

For facilities having automated transportation mechanisms (e.g., elevators, escalators, people movers, dumbwaiter, and/or the like), the facilities may be configured to operate the automated transportation mechanisms automatically, in order to move a particular mobile device user and/or item toward a desired destination. As a specific example, the facility may monitor the location of a particular mobile device user (e.g., via the user's mobile computing entity) as the mobile device user moves along the recommended travel path toward the desired destination. As the mobile device user nears an automated transport mechanism on the recommended travel path, the facility automatically positions the automated transport mechanism so that the mobile device user may board the automated transport mechanism to be moved toward the desired destination location. Once the facility detects the mobile device user as being on the automated transport mechanism, the facility may move the automated transport mechanism toward the desired destination location without requiring additional user input from the mobile device user. As a specific example, a facility may position an elevator such that the mobile device user may board the elevator upon determining that the mobile device user is proximate the elevator. The elevator may then automatically move to the floor on which a desired destination is located, without requiring the mobile device user to provide any user input directly to the elevator and/or a user interface associated with the elevator.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAIVI), phase-change random access memory (PRAM), ferroelectric random-access memory (FeRAIVI), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system that can be used in conjunction with various embodiments of the present invention. As shown in FIG. 1, the system may include one or more vehicles 100, one or more mobile computing entities 105, one or more mapping computing entities 110, one or more Global Positioning System (GPS) satellites 115, one or more location sensors 120, one or more information/data collection devices 130, one or more networks 135, one or more location devices 400, one or more user computing entities 140 (not shown), and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, stand-alone entities, the various embodiments are not limited to this particular architecture.

A. Exemplary Vehicle

In various embodiments, the term vehicle 100 is used generically. For example, a vehicle 100 may be a manned or an unmanned tractor, truck, car, motorcycle, moped, Segway, bicycle, golf cart, hand truck, dolly, cart, trailer, tractor and trailer combination, van, flatbed truck, vehicle, drone, airplane, helicopter, boat, barge, and/or any other form of object for moving or transporting people and/or items (e.g., one or more packages, parcels, bags, containers, loads, crates, items banded together, vehicle parts, pallets, drums, the like, and/or similar words used herein interchangeably). In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, hand truck ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to the vehicle 100.

FIG. 1 shows one or more computing entities, devices, and/or similar words used herein interchangeably that are associated with the vehicle 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

In one embodiment, the information/data collection device 130 may include, be associated with, or be in wired or wireless communication with one or more processors (various exemplary processors are described in greater detail below), one or more location-determining devices or one or more location sensors 120 (e.g., Global Navigation Satellite System (GNSS) sensors, indoor location sensors, such as Bluetooth sensors, Wi-Fi sensors, and/or the like), one or more real-time clocks, a J-Bus protocol architecture, one or more electronic control modules (ECM), one or more communication ports for receiving information/data from various sensors (e.g., via a CAN-bus), one or more communication ports for transmitting/sending data, one or more RFID tags/sensors, one or more power sources, one or more information/data radios for communication with a variety of communication networks, one or more memory modules, and one or more programmable logic controllers (PLC). It should be noted that many of these components may be located in the vehicle 100 but external to the information/data collection device 130.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like.

As discussed herein, triangulation and/or proximity based location determinations may be used in connection with a device associated with a particular vehicle and/or the vehicle's operator and with various communication points (e.g., cellular towers, Wi-Fi access points, location devices 400, and/or the like) positioned at various locations throughout a geographic area and/or throughout an interior of a facility to monitor the location of the vehicle 100 and/or its operator. The one or more location sensors 120 may be used to receive latitude, longitude, altitude, heading or direction, geocode, course, position, time, location identifying information/data, and/or speed information/data (e.g., referred to herein as location information/data and further described herein below). The one or more location sensors 120 may also communicate with the mapping computing entity 110, the information/data collection device 130, mobile computing entity 105, and/or similar computing entities.

In one embodiment, the ECM may be one of several components in communication with and/or available to the information/data collection device 130. The ECM, which may be a scalable and subservient device to the information/data collection device 130, may have information/data processing capability to decode and store analog and digital inputs received from, for example, vehicle systems and sensors. The ECM may further have information/data processing capability to collect and present location information/data to the J-Bus (which may allow transmission to the information/data collection device 130), and output location identifying data, for example, via a display and/or other output device (e.g., a speaker).

As indicated, a communication port may be one of several components available in the information/data collection device 130 (or be in or as a separate computing entity). Embodiments of the communication port may include an Infrared information/data Association (IrDA) communication port, an information/data radio, and/or a serial port. The communication port may receive instructions for the information/data collection device 130. These instructions may be specific to the vehicle 100 in which the information/data collection device 130 is installed, specific to the geographic area and/or serviceable point in which the vehicle 100 will be traveling, specific to the function the vehicle 100 serves within a fleet, and/or the like. In one embodiment, the information/data radio may be configured to communicate with a wireless wide area network (WWAN), wireless local area network (WLAN), wireless personal area network (WPAN), or any combination thereof. For example, the information/data radio may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol. As yet other examples, the communication port may be configured to transmit and/or receive information/data transmissions via light-based communication protocols (e.g., utilizing specific light emission frequencies, wavelengths (e.g., visible light, infrared light, and/or the like), and/or the like to transmit data), to transmit data) via sound-based communication protocols (e.g., utilizing specific sound frequencies to transmit data), and/or the like.

In various embodiments, the vehicle may comprise one or more input devices and/or one or more output devices configured to receive user input and/or to provide visual and/or audible output to the vehicle's operator. For example, the vehicle may comprise a touchscreen (e.g., a capacitive touchscreen), a keyboard, a mouse, a touchpad, a display (e.g., an LCD display, an LED display, a tube display, and/or the like), and/or the like. Accordingly, the vehicle may be configured to provide the vehicle operator with vehicle-specific data, such as location information/data for the vehicle, in real-time.

B. Exemplary Mapping Computing Entity

Figure 2:
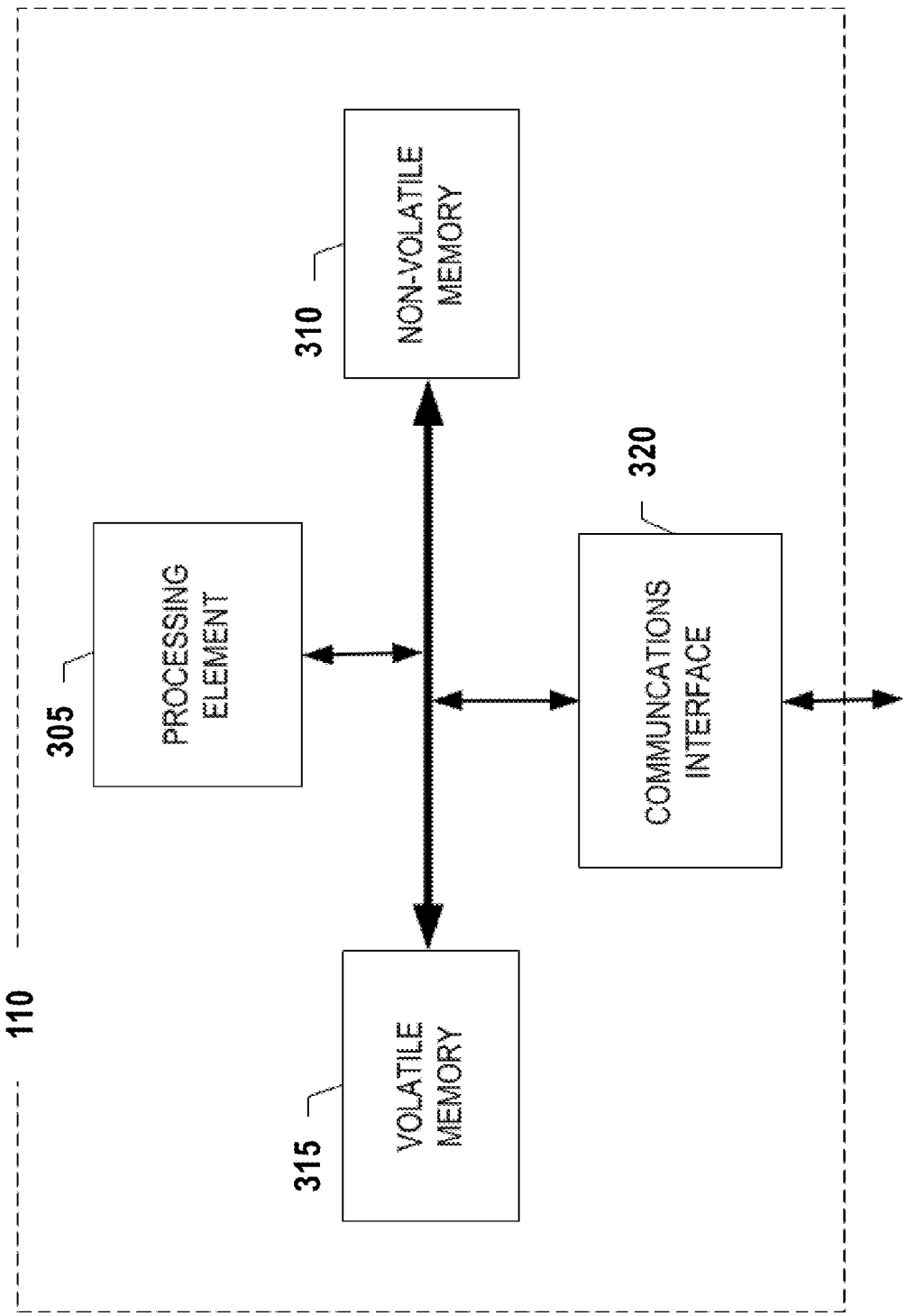
FIG. 2 is a schematic of a mapping computing entity in accordance with certain embodiments of the present invention.

FIG. 2 provides a schematic of a mapping computing entity 110 according to one embodiment of the present invention. In various embodiments, each facility (e.g., office building, apartment building, storage building, campus, office suite, hotel, motel, inn, school, house, warehouse, convention center, and/or the like) may have a corresponding facility-specific mapping computing entity 110 configured to store and/or provide information/data indicative of various locations within the facility. In certain embodiments, various entities may comprise a mapping computing entity 110 storing location information/data for various locations located in a plurality of facilities. For example, a carrier may have a third-party mapping computing entity 110 storing location information/data for various locations internal to a plurality of facilities. A carrier may be a traditional carrier, such as United Parcel Service (UPS), FedEx, DHL, courier services, the United States Postal Service (USPS), Canadian Post, freight companies (e.g. truckload, less-than-truckload, rail carriers, air carriers, ocean carriers, etc.), and/or the like. However, a carrier may also be a nontraditional carrier, such as Coyote, Amazon, Google, Uber, ride-sharing services, crowd-sourcing services, retailers, and/or the like. Accordingly, each time an employee of the carrier arrives at a particular facility, the carrier's mapping computing entity 110 may provide the employee with location information/data corresponding to the particular facility.

In various embodiments, a third party may provide software to configure a facility-specific mapping computing entity 110 to provide various internal addressing and/or navigational features as discussed herein. In various embodiments, the provided software may comprise algorithms for generating and/or storing map data, algorithms for generating recommended navigational routes to a desired destination location (as discussed herein), and/or the like. In various embodiments, the software may be configurable based on hardware utilized at a particular facility. For example, the software may be configured such that signals generated according to the third-party provided software are compatible and readable with various hardware components (e.g., transportation mechanisms, location devices 400, and/or the like) located within the facility.

Moreover, the provided software may be configured to provide security features for a specific facility. The software may be configured to enable certain devices (e.g., certain mobile computing entities 105) to connect and communicate with various hardware components (e.g., location devices 400) within the facility. For example, the software may be configured to enable all devices of a certain type (e.g., a mobile computing entity 105 type carried by employees of a particular carrier), devices having corresponding specific identifiers (e.g., serial numbers, device names, and/or the like), devices associated with specific mobile device users, and/or the like to connect with the various building hardware components.

In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons 400, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the mapping computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the mapping computing entity 110 may communicate with vehicles 100, mobile computing entities 105, location devices 400, and/or the like.

As shown in FIG. 2, in one embodiment, the mapping computing entity 110 may include or be in communication with one or more processing elements 305 (also referred to as processors, processing circuitry, and/or similar terms used herein interchangeably) that communicate with other elements within the mapping computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the mapping computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the mapping computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the mapping computing entity 110 with the assistance of the processing element 305 and operating system.

As indicated, in one embodiment, the mapping computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the mapping computing entity 110 may communicate with computing entities or communication interfaces of the vehicle 100, mobile computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the mapping computing entity 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. As yet other examples, the mapping computing entity 110 may be configured to transmit and/or receive information/data transmissions via light-based communication protocols (e.g., utilizing specific light emission frequencies, wavelengths (e.g., visible light, infrared light, and/or the like), and/or the like to transmit data), to transmit data) via sound-based communication protocols (e.g., utilizing specific sound frequencies to transmit data), and/or the like. Although not shown, the mapping computing entity 110 may include or be in communication with one or more input elements, such as a keyboard input, a mouse input, a touch screen/display input, audio input, pointing device input, joystick input, keypad input, and/or the like. The mapping computing entity 110 may also include or be in communication with one or more output elements (not shown), such as audio output, video output, screen/display output, motion output, movement output, and/or the like.

As will be appreciated, one or more of the mapping computing entity's 110 components may be located remotely from other mapping computing entity 110 components, such as in a distributed system. Furthermore, one or more of the components may be combined and additional components performing functions described herein may be included in the mapping computing entity 110. Thus, the mapping computing entity 110 can be adapted to accommodate a variety of needs and circumstances.

C. Exemplary Mobile Computing Entity

In various embodiments, a mobile device as discussed herein may be a mobile computing entity 105. As other examples discussed herein, a mobile device may be a shipment/item, a user's identification device (e.g., ID tag), a vehicle 100, and/or the like.

Figure 3:
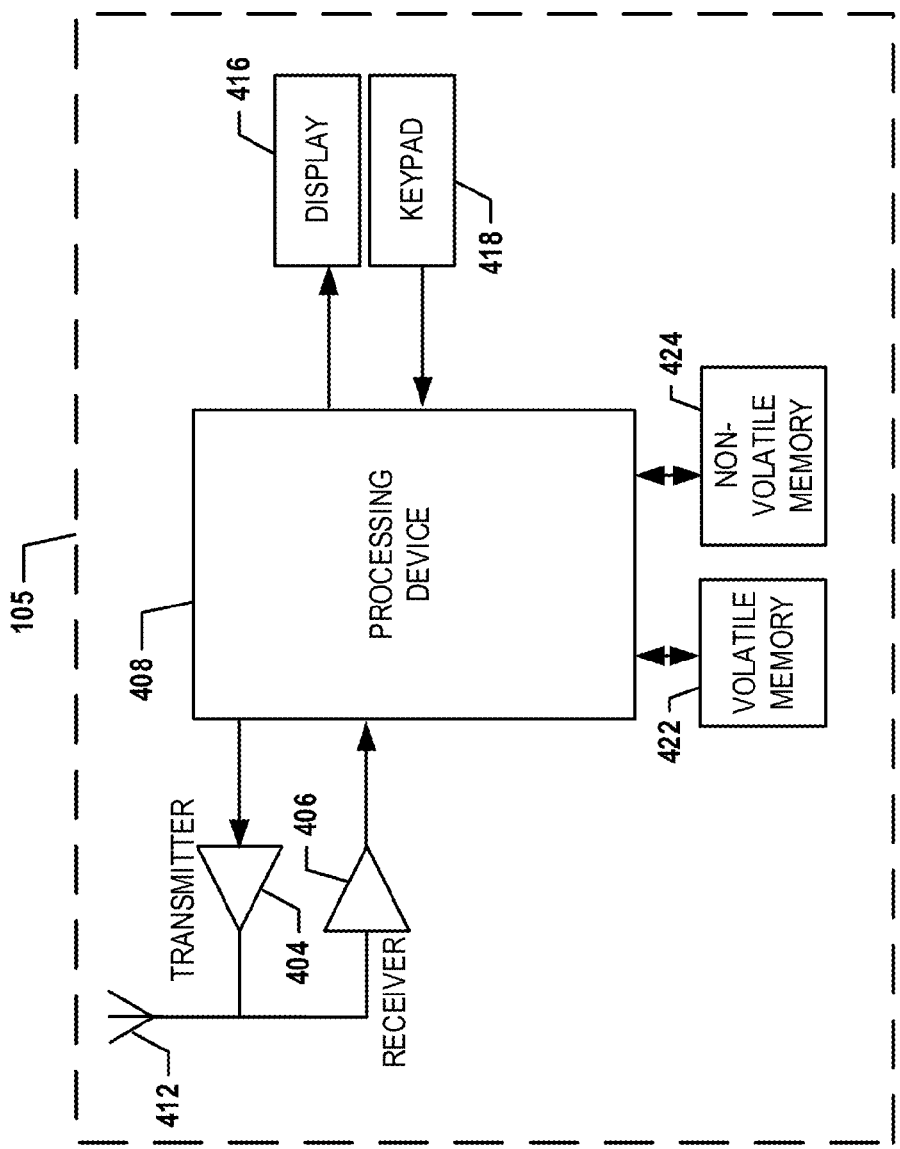
FIG. 3 is a schematic of a mobile computing entity in accordance with certain embodiments of the present invention.

FIG. 3 provides an illustrative schematic representative of a mobile computing entity 105 that can be used in conjunction with embodiments of the present invention. In one embodiment, the mobile computing entities 105 may include one or more components that are functionally similar to those of the mapping computing entity 110 and/or as described below. As will be recognized, mobile computing entities 105 can be operated by various parties, including operators of vehicles 100. As shown in FIG. 3, a mobile computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles 100, mapping computing entities 110, location devices 400, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. As yet other examples, the mobile computing entity 105 may be configured to transmit and/or receive information/data transmissions via light-based communication protocols (e.g., utilizing specific light emission frequencies, wavelengths (e.g., visible light, infrared light, and/or the like), and/or the like to transmit data), to transmit data) via sound-based communication protocols (e.g., utilizing specific sound frequencies to transmit data), and/or the like.

Via these communication standards and protocols, the mobile computing entity 105 can communicate with various other entities using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), and operating system.

According to one embodiment, the mobile computing entity 105 may include location determining aspects, devices, modules, functionalities, and/or similar words used herein interchangeably. For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the mobile computing entity's 105 position in connection with a variety of other systems, including cellular towers, Wi-Fi access points, location devices 400, and/or the like. Similarly, the mobile computing entity 105 may include indoor positioning aspects, such as a location module adapted to acquire, for example, latitude, longitude, altitude, geocode, course, direction, heading, speed, time, date, location identifying data, and/or various other information/data. Some of the indoor aspects may use various position or location technologies including RFID tags, indoor location devices 400 or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the telematics data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing entity 105.

D. Exemplary User Computing Entity

In one embodiment, the user computing entities may each include one or more components that are functionally similar to those of the mapping computing entity 110 and/or the mobile computing entity 105. For example, in one embodiment, each of the user computing entities may include: (1) a processing element that communicates with other elements via a system interface or bus; (2) a user interface; (3) transitory and non-transitory memory; and (4) a communications interface. As previously noted, the user computing entity may comprise a user interface. For example, the user interface may be an application, browser, user interface, dashboard, webpage, and/or similar words used herein interchangeably executing on and/or accessible via the user computing entity to interact with and/or cause display of information/data from the mapping computing entity 110 and/or the mobile computing entity 105, as described herein. These architectures are provided for exemplary purposes only and are not limiting to the various embodiments.

E. Exemplary Facilities

In one embodiment, a facility, facility address, and/or similar words used herein interchangeably may be any identifiable location having a physical address, such as one or more campuses, lockers, access points, delivery locations, longitude and latitude points, geocodes, stops (e.g., pick up stops, delivery stops, vehicle visits, stops) geofenced areas, geographic areas, landmarks, buildings, bridges, and/or other identifiable locations. For example, a facility may be a residential location, such as one or more homes, one or more mobile homes, one or more apartments, one or more apartment buildings, one or more condominiums, one or more townhomes, and/or the like. A facility may also be a commercial location, such as one or more stores in a mall having a defined address, one or more office buildings, one or more office parks, one or more offices of an office complex, one or more garages, one or more lockers or access points, one or more warehouses, one or more restaurants, one or more stores, one or more retail locations, and/or the like. As will be recognized, a variety of approaches and techniques can be used to adapt to various needs and circumstances.

As discussed herein, facilities may encompass one or more internal locations having corresponding internal addresses. The internal locations may comprise one or more rooms, hallways, portions of rooms, portions of hallways, cubicles, offices, stalls, restrooms, furniture (e.g., desks, chairs, and/or the like), walls, floors, portions of floors, stores, departments, elevators, stairwells, escalators, ramps, walkways, catwalks, roofs, basements, parking spaces, buildings (e.g., in a multi-building campus), mobile devices, and/or the like. In various embodiments, only a subset of a plurality of internal locations may be associated with corresponding internal addresses. For example, various floors, portions of floors, rooms, portions of rooms, furniture, and/or the like may be associated with one or more internal addresses, while other internal locations, such as hallways, walls, and/or the like may not be specifically associated with an internal address. As discussed herein, the internal addresses may correspond to one or more network enabled computing entities, such as one or more location devices 400. Moreover, as discussed herein, facilities may encompass a plurality of location devices 400 each associated with one or more internal locations, internal addresses, and/or the like. In various embodiments, a facility may encompass a network of location devices 400, collectively providing information/data regarding a plurality of internal locations within the facility. Moreover, in various embodiments, facilities may each be associated with a location device 400 providing a general internal address for the facility.

F. Exemplary Shipment/Item

In one embodiment, a shipment/item may be any tangible and/or physical object. In one embodiment, a shipment/item may be or be enclosed in one or more packages, envelopes, parcels, bags, goods, products, containers, loads, crates, items banded together, vehicle parts, pallets, drums, the like, and/or similar words used herein interchangeably. In one embodiment, each shipment/item may include and/or be associated with an item/shipment identifier, such as an alphanumeric identifier. Such item/shipment identifiers may be represented as text, barcodes, tags, character strings, Aztec Codes, MaxiCodes, information/data Matrices, Quick Response (QR) Codes, electronic representations, and/or the like. A unique item/shipment identifier (e.g., 123456789) may be used by the carrier to identify and track the shipment/item as it moves through the carrier's transportation network. Further, such item/shipment identifiers can be affixed to shipments/items by, for example, using a sticker (e.g., label) with the unique item/shipment identifier printed thereon (in human and/or machine readable form) or an RFID tag with the unique item/shipment identifier stored therein. Such items may be referred to as "connected" shipments/items and/or "non-connected" shipments/items.

In one embodiment, connected shipments/items include the ability to determine their locations and/or communicate with various computing entities. This may include the shipment/item being able to communicate via a chip or other devices, such as an integrated circuit chip, RFID technology, Near Field Communication (NFC) technology, Bluetooth technology, Wi-Fi technology, light-based communication protocols, sound-based communication protocols, and any other suitable communication techniques, standards, or protocols with one another and/or communicate with various computing entities for a variety of purposes. Connected shipments/items may include one or more components that are functionally similar to those of the carrier server 100 and/or the mobile device 110 as described herein. For example, in one embodiment, each connected shipment/item may include one or more processing elements, one or more display device/input devices (e.g., including user interfaces), volatile and non-volatile storage or memory, and/or one or more communications interfaces. In this regard, in some example embodiments, an shipment/item may communicate send "to" address information/data, received "from" address information/data, unique identifier codes, location information/data, status information/data, and/or various other information/data.

In one embodiment, non-connected shipments/items do not typically include the ability to determine their locations and/or might not be able communicate with various computing entities or are not designated to do so by the carrier. The location of non-connected shipments/items can be determined with the aid of other appropriate computing entities. For example, non-connected shipments/items can be scanned (e.g., affixed barcodes, RFID tags, and/or the like) or have the containers or vehicles in which they are located scanned or located. As will be recognized, an actual scan or location determination of a shipment/item is not necessarily required to determine the location of a shipment/item. That is, a scanning operation might not actually be performed on a label affixed directly to a shipment/item or location determination might not be made specifically for or by a shipment/item. For example, a label on a larger container housing many shipments/items can be scanned, and by association, the location of the shipments/items housed within the container are considered to be located in the container at the scanned location. Similarly, the location of a vehicle transporting many shipments/items can be determined, and by association, the location of the shipments/items being transported by the vehicle are considered to be located in the vehicle 100 at the determined location. These can be referred to as "logical" scans/determinations or "virtual" scans/determinations. Thus, the location of the shipments/items is based on the assumption they are within the container or vehicle, despite the fact that one or more of such shipments/items might not actually be there.

G. Exemplary Location Device

In various embodiments, one or more location devices 400 located within a facility may be utilized to provide location information/data to one or more mobile devices (e.g., mobile computing entity 105, shipment/item, vehicle 100, and/or the like) located within the facility, and/or to provide internal address information/data indicative of the current location of a particular mobile device user, internal location, and/or the like. For example, the location devices 400 may be associated with and/or define a particular internal location (e.g., a cubicle, a hallway, a floor, a portion of a floor, a portion of a hallway, a department, a store, and/or the like). In various embodiments, the location devices 400 may each be configured to broadcast information/data indicative of the internal location associated with the location device 400 wirelessly, within a wireless communication range associated with the location device 400. Accordingly, the location devices 400 may be configured to broadcast information/data indicative of the identity of their location to other devices (e.g., mobile computing entities 105, vehicles, connected shipments/items, and/or the like) located within the communication range of the location device. Thus, as a device (e.g., mobile computing entity 105) enters the transmission range associated with the location device 400, the device may be configured to determine its location based on the information/data received from the location device 400.

In various embodiments, the location devices 400 may be configured to broadcast location information/data wirelessly via radio transmission (e.g., Wi-Fi, Bluetooth®, BLE, and/or the like), light transmission (e.g., visible light, infrared light, and/or the like detectable via a mobile computing entity 105), sound transmission, and/or the like. In various embodiments, the broadcast signals from the location devices 400 may enable a mobile computing entity 105 (or other device) to determine its location (e.g., based on the location of the location device 400) and/or the mobile computing entity's heading. For example, signals broadcast from a location device 400 may be directional, such that a mobile computing entity 105 may be configured to determine its direction relative to the directional signal broadcast from the location device 400.

The location devices 400 may comprise one or more wireless transmitters and/or receivers, as described herein with respect to various computing entities. In various embodiments, the location devices 400 may comprise a short range wireless transmitter and/or receiver (e.g., Bluetooth®, BLE, and/or the like) and/or a long range wireless transmitter and/or receiver (e.g., Wi-Fi). Accordingly, the location devices 400 may be configured to transmit information/data indicative of the identity of the internal location associated with the location device 400 via short-range wireless transmitters and may transmit other information/data to computing entities via the long range wireless transmitters.

In various embodiments, the location devices 400 may be configured to receive information/data transmitted from one or more computing entities, such as one or more mobile computing entities 105 (or other devices such as internal building systems) and to provide navigational and/or other information/data to a user of the mobile computing entity 105. The location devices 400 may be configured to operate as an information/data relay between the mobile computing entity 105 (or other device) and the mapping computing entity 110. For example, the location devices 400 may be configured to receive information/data indicative of a desired destination for a mobile device user from a mobile computing entity 105 (or other mobile device). The location devices 400 may be configured to relay the received information/data to a mapping computing entity 110, which may be configured to determine a recommended route between the current location of the mobile computing entity 105 (determined based at least in part on the location and/or identity of the location device 400) and the desired destination location. As yet another example, a location device 400 may receive information/data indicative of a desired delivery location from a connected shipment/item and may relay the desired delivery location to a mapping computing entity 110 to determine a recommended route to the desired delivery location. In various embodiments, one or more of the location devices 400 (including the location device 400 proximate to the mobile computing entity 105 and/or other location devices 400) may receive information/data instructing the location devices 400 to provide guidance to the mobile device user (e.g., delivery person delivering the connected shipment/item), for example, by providing an indicia of a recommended direction of travel to reach the desired destination. For example, the location devices 400 may have associated notification mechanisms, such as speakers, lights (e.g., Light Emitting Diodes), displays, and/or the like configured to provide an indication of a direction of travel for the mobile device user. As described herein, the mapping computing entity 110 of the facility may provide information/data instructing location devices 400 located along the recommended travel path to illuminate an indicator in a particular color in order to provide a path of lights for the mobile device user to follow to the desired destination.

Accordingly, the location devices 400 may be in wireless and/or wired communication with other devices, such as other location devices 400, user computing entities, mobile computing entities 105, mapping computing entities 110, vehicles, shipments/items, and/or the like. Each location device 400 may comprise one or more memory storage units (e.g., for storing information/data indicative of a location corresponding to the location device 400), one or more processing units, and/or the like. In various embodiments, the location devices 400 may be standalone units providing location information/data for various internal mapping, internal navigation, and/or internal addressing functions. One or more location devices 400 may be secured relative to a particular item, device, and/or the like, and may store information/data indicative of an internal location description for the item, device, and/or the like to which it is attached. For example, a location device 400 may be secured to a ceiling tile, a desk, a chair, a wall, a floor tile, an elevator, a step, a door, and/or the like. In other embodiments, the location devices 400 may be embodied as one or more network enabled devices (e.g., Internet of Things enabled devices), such as a thermostat, light fixture, light switch, desktop computer, notebook computer, electronic whiteboard, and/or the like.

As noted herein, each location device 400 may be configured to store information/data indicative of an internal location associated with the location device 400. For example, the information/data stored by the location device 400 may comprise at least a portion of an internal address within a particular facility (e.g., within a building, a campus, and/or the like). The location information/data stored by the location devices 400 may comprise a character and/or a string of characters, a symbol, and/or the like. In certain embodiments, the location information/data may comprise data received from a plurality of location information/data sources. In various embodiments, the location information/data may be indicative of a relative location of the location device 400 within the facility. For example, the location information/data may be indicative of a floor on which the location device 400 is located, a room in which the location device 400 is located, a building (e.g., in a multi-building facility) in which the location device 400 is located, and/or the like. As a specific example, the location device 400 may store a portion of an internal address in the form of 05L37D89, which may correlate to Desk Number 89, located proximate Light Fixture Number 37, on Floor 5 of a particular facility.

In various embodiments, the location information/data may be dynamic location information/data reflective of a current location of a mobile device relative to one or more location devices 400. For example, the location information/data may comprise an internal address comprising data indicative of a mobile device located proximate a location device 400. With reference to the above mentioned example location address (05L37D89), in various embodiments, the address may be updated to reflect the location of a particular mobile device (e.g., a mobile device associated with a resident of a building). Accordingly, a mobile device identifier (e.g., a character string) may be appended onto the location address to reflect the current location of the mobile device. As a specific example, if a mobile device having an associated mobile device identifier P33 is located near the above-mentioned address, the indoor address for the mobile device may be 05L37D89P33. In various embodiments, a plurality of mobile devices located at the same internal location may have different internal location addresses. For example, a first mobile device may be associated with the internal location address 05L37D89P33, while a second mobile device may be associated with the internal location address 05L37D89P46. Accordingly, the internal location addresses for each mobile device may reflect that the location devices are located at the same internal location, but may reflect a distinction in identity between the various mobile devices.

In various embodiments, location devices 400 may be in communication with other location devices 400 in order to provide information/data indicative of the current internal location of a particular location device 400, to provide information/data indicative of navigational instructions between location devices 400, and/or to provide other information/data between a plurality of location devices 400. In various embodiments, location devices 400 may be in communication with one another in a hierarchical fashion, for example, in which a plurality of location devices 400 are in communication with a master location device 400. For example, each master beacon 400 may be associated with a large area within a location (e.g., a single floor in a multi-floor building, a geofenced area within a particular building, one or more areas associated with defined, subservient location devices 400, and/or the like) and each subservient location device 400 may be associated with a small area within the area corresponding to the master beacon 400 (e.g., a particular cubicle on the floor of the building). With reference again to the above example internal address (05L37D89), a first master level location device 400 associated with the fifth floor of the building may provide the first two digits (05) of the address, a second master level location device 400 associated with the Light Fixture 37 may provide the second three digits (L37), and a third level location device 400 associated with Desk 89 may provide the last three digits (D89). It should be understood that this example should not be construed as limiting, as various location devices 400 may provide other configurations and/or portions of an internal address.

As yet another example, each location device 400 may be a standalone location device 400 in direct communication with a mapping computing entity 110. In such embodiments, each location device 400 may comprise the entirety of the internal address corresponding to the location device 400. In such embodiments, the mapping computing entity 110 may store information/data indicative of the location of various location devices 400 within the facility. For example, the mapping computing entity 110 may store digital map information/data for a facility having an indication of the location of each location device 400 stored within the map information/data.

As mentioned herein, the location devices 400 may comprise one or more notification mechanisms (e.g., visual notifications, audible notifications, haptic feedback, taptic feedback, artificial intelligence, and/or the like). For example, one or more location devices 400 may comprise one or more light sources (e.g., Light Emitting Diodes ("LEDs")) configured to emit light in response to one or more signals received from another computing entity. In certain embodiments, the one or more location devices 400 may comprise a plurality of light sources and/or one or more light sources configured to emit multiple light colors (e.g., light having a selectable wavelength) in order to convey specific information/data to various mobile device users. For example, a location device 400 may be configured to emit a first light color to indicate a desired direction of travel and a second light color to indicate the location of a desired destination. In certain embodiments, the location devices 400 may be configured to emit one or more audible sounds, for example, to guide a mobile device user to a desired internal location within a serviceable point.

In various embodiments, location information/data stored on one or more location devices 400 may be generated manually during a location device 400 initialization process, and/or automatically. For example, location information/data indicative of a particular internal location may be manually loaded onto a storage device associated with a location device 400 (e.g., based on user input received by the location device 400). In such embodiments, information/data indicative of the relative locations of various location devices 400 within a serviceable point may be manually and/or automatically determined to enable internal mapping and/or internal navigation between various internal locations. Information/data indicative of the internal addresses associated with each of the plurality of location devices 400 may be stored in association with the mapping computing entity 110, such that mapping and/or navigational operations may be enabled by the mapping computing entity 110.

In certain embodiments, the mapping computing entity 110 may be configured to automatically associate various internal addresses with various location devices 400. For example, the various location devices 400 may be configured to automatically identify other location devices 400 in an area surrounding the location device 400 in order to determine a relative location of each location device 400 relative to other location devices 400. Moreover, the mapping computing entity 110 may comprise information/data indicative of an internal map, such as a blueprint (e.g., a two-dimensional blueprint and/or a three-dimensional blueprint) and may be configured to associate the relative locations of various location devices 400 with particular internal locations reflected within the internal map.

As discussed herein, one or more computing entities (e.g., mobile computing entity 105) may provide functionality similar to a location device 400. For example, a mobile computing entity 105 associated with a particular mobile device user located within a facility may operate as a location device 400 indicating the current location of the associated mobile device user. In such embodiments, the mobile computing entity 105 may be configured to determine its location relative to one or more location devices 400 to enable its location to be monitored and/or stored by a mapping computing entity 110. Accordingly, a particular mobile computing entity 105 may be identified as a desired destination location for a particular mobile device user, and the mapping computing entity 110 (and/or another computing entity 105) may be configured to generate a recommended route to the current location of the mobile computing entity 105 defining the destination location. Thus, for example, the current location of the associated mobile device user may be monitored and/or identified as a desired destination within the facility. The mapping computing entity 110 may thus be configured to determine a recommended travel path from a particular location to the current location of a mobile device user, based at least in part on the current location of the associated computing entity 105.

H. Exemplary Transportation Mechanism

In various embodiments, a transportation mechanism may be configured for movement of a user, an item, and/or the like within a serviceable point. For example, transportation mechanisms may comprise elevators, dumbwaiters, escalators, people movers, moving walkways, automated transit (e.g., monorail, train, and/or the like), and/or the like. In various embodiments, transportation mechanisms may comprise one or more computing mechanisms, such as one or more processors, memory storage devices, communication interfaces, and/or the like, as described herein in reference to other computing entities. In various embodiments, transportation mechanisms may be in wired and/or wireless communication with one or more other computing entities, such as mapping computing entity 110, mobile computing entities 105, location devices 400, and/or the like. Moreover, in various embodiments, one or more transportation mechanisms may comprise one or more location devices 400 associated with the transportation mechanism.

In various embodiments, one or more transportation mechanisms may be selectably and/or continuously operable. For example, an escalator may be configured to operate continuously, regardless of whether a person and/or item is being transported by the escalator. Alternatively, a transportation mechanism, such as an elevator (and/or an escalator), may be configured to operate (e.g., move) only in response to an indication that a person and/or item is located thereon.

In various embodiments, the one or more transportation mechanisms may be configured to receive information/data indicative of the presence of a user based on information/data received from a mobile computing entity indicative of the presence of a user proximate a particular transportation mechanism. In various embodiments, the one or more transportation mechanisms may be configured to move to a particular location to pick up a user carrying the detected mobile computing entity (e.g., an elevator may move to a particular floor at which the mobile computing entity is detected). Moreover, the one or more transportation mechanisms may be configured to receive a desired location (e.g., a desired floor) for permitting a user to exit the transportation mechanism from the mobile computing entity (and/or another computing entity). Accordingly, various transportation mechanisms need not require physical user interactions (e.g., pressing buttons) in order to operate the transportation mechanism.

III. Exemplary System Operation

Various embodiments are configured for providing one or more internal locations with corresponding internal addresses based on a location of one or more location devices 400, and for providing guidance to a particular location having an internal address.

A. Internal Addressing

As discussed above, various locations (and/or mobile devices) within a facility may be associated with defined internal addresses unique to each of the various locations. The internal addresses may correspond to a particular location within the facility, as reflected in map information/data stored for a particular facility. In various embodiments, the internal addresses may be identified in reference to location devices 400 located nearby to various internal locations.

Each of a variety of locations may correspond to unique internal addresses that may distinguish a particular location from others in the same facility. Accordingly, a particular internal location, such as a particular cubicle, office, floor, room, and/or the like, may be identified based on a corresponding internal address. In certain embodiments, internal addresses may comprise one or more information/data elements configured to be reflective of a particular location corresponding to the particular address. As discussed herein, a particular internal address may comprise a portion identifying a floor, a portion of a floor (e.g., corresponding to a particular light fixture within the portion of the floor), a building (e.g., within a multi-building facility), and/or a particular internal location (e.g., a piece of furniture (e.g., a desk)) located proximate the light fixture. However, internal addresses for various internal locations may be defined in any of a variety of ways, such as via unique character strings. As discussed herein, an internal address may be generated based on data identifying a plurality of associated locations, devices, objects, and/or the like. Moreover, various internal addresses may be static and/or dynamic internal addresses (e.g., an address of a particular room may be static and an address of a particular mobile device may be dynamic). For example, an individual (e.g., having an associated mobile device) in a cubicle/office may have an internal address determined based at least in part on an internal address associated with a nearby light fixture, a nearby desk, a nearby mobile device, and/or the like. Moreover, a second individual entering the same space with a second mobile device may have a second dynamic internal address at the same location, and reflecting the identity of the second mobile device. Accordingly, in various embodiments, particular internal locations may be associated with multiple unique internal addresses based at least in part on a mobile device located at the internal location.

Moreover, one or more internal addresses may correspond to a variety of internal locations within a single building defining a facility, and/or a variety of locations within a plurality of buildings collectively defining a facility (e.g., within a multi-building campus). Accordingly, in various embodiments, an internal address may be indicative of a particular building, a particular floor within the building, a particular region of the floor, and/or a particular piece of furniture (or other internal location) within the particular region of the floor.

In various embodiments, the internal addresses may correspond with one or more location devices 400 located near the addressed locations. For example, each location device 400 may have associated location information/data identifying the particular location device 400. The location information/data may comprise a unique identifier for the location device 400, and a particular location proximate the location device 400 may be identified based on the unique identifier of the location device 400. As a specific example, if a location device 400 located within a particular office is identified as 05L56R10, then the internal address for the particular office may be 05L56R10.

In various embodiments, the internal addresses may be correlated with map information/data comprising information/data indicative of the relative position of various locations. For example, the map information/data may comprise one or more building (or campus) maps, blueprints, and/or the like, such as two-dimensional maps, three-dimensional maps, and/or the like in order to provide a locational relationship between the one or more internal addresses and various other locations within a particular building and/or campus. In various embodiments, the map information/data may be stored in the mapping computing entity 110 having embedded internal location information/data points stored therein. In various embodiments, the map information/data having embedded internal location information/data points may be publicly accessible. However, in other embodiments, the map information/data may be privately stored, such that only authorized personnel are granted access to at least a portion of the map information/data. For example, as discussed herein, the map information/data and/or other information/data associated with the internal addressing features may be provided to various users (e.g., via a mobile computing entity 105) upon receipt of authorization information/data from a user. For example, the user may be required to provide a user name and/or password, and/or other authorization information/data to the mapping computing entity 110 prior to receiving the map information/data for a particular facility.

Moreover, the map information/data may be reflective of the location of one or more location devices 400 within the facility. In various embodiments, the map information/data may be automatically and/or manually populated with the relative positioning of the location devices 400. For example, the mapping computing entity 110 may be configured to identify a relative location of a particular location device 400 within stored map information/data based at least in part on location information/data stored for the location device 400. For example, location information/data for a particular location device 400 may be indicative of a floor, a location on a floor, a building, and/or the like for the location device 400. Similarly, the map information/data may comprise information/data identifying various portions of the map information/data as a particular floor, a particular location on a floor, and/or the like. For example, as shown in the example map information/data shown in FIG. 4, the map information/data may comprise information/data indicative of the location of various location devices 400 relative to various walls, doors, and/or rooms. Moreover, the map information/data may comprise information/data indicative of various internal addresses associated with various locations (e.g., associated with the locations of various location devices), and/or the like. Accordingly, the mapping computing entity 110 may be configured to correlate the location information/data for a particular location device 400 with information/data identifying various locations within the map information/data to automatically identify a precise location of a location device 400 within the map information/data. However, it should be understood that the location of various location devices 400 may be manually provided within the map information/data.

In certain embodiments, the map information/data may be stored in a mapping computing entity 110 associated with the mapped facility. Thus, facilities may store their own map information/data and may communicate various portions of the stored map information/data to various computing entities (e.g., mobile computing entities 105), via the internet, via local area networks, and/or the like. For example, map information/data corresponding to a particular facility may be communicated to a particular mobile computing entity 105 when the mobile computing entity 105 is located within a particular geographical area (e.g., within the facility, within a defined geofenced area, within a wireless communication range of one or more location devices 400 located within the facility, and/or the like). In such embodiments, the mapping computing entity 110 may be configured to transmit at least a portion of the map information/data to the computing entity upon establishing an electronic communication between the mobile computing entity and one or more electronic entities (e.g., mapping computing entity and/or location devices 400) corresponding to the facility. Accordingly, the map information/data may be publicly accessible to visitors of a facility. However, in certain embodiments, the mapping computing entity 110 may be configured to only transmit map information/data to authorized computing entities, and in such embodiments, the computing entity may be required to present authentication information/data to the mapping computing entity 110 before the mapping computing entity 110 transmits map information/data to the computing entity. For example, a user of a mobile computing entity 105 may be configured to provide authentication information/data (e.g., a user name and/or password) in order to receive map information/data from the mapping computing entity 110. Thus, the mapping computing entity 110 may be configured to provide map information/data only to authenticated users, thereby limiting distribution of the map information/data.

In various embodiments, the mapping information/data may be provided to one or more mobile computing entities 105 from the mapping computing entity 110 via one or more wired and/or wireless networks (e.g., the internet, an intranet, and/or the like). The map information/data may be provided to the mobile computing entity 105 with an indication of entity current location of the mobile computing entity 105, and/or the mobile computing entity 105 may be configured to separately determine its own location and/or to generate a dynamic internal address corresponding to the mobile computing entity 105. As just one example, the mapping computing entity 110 may provide the mobile computing entity 105 with at least a portion of the map information/data via a network connection between the mobile computing entity 105 and the mapping computing entity 110. As a specific example, the mapping computing entity 110 may be configured to provide at least a portion of the map information/data upon the mobile computing entity 105 connecting to a wireless network (e.g., a Wi-Fi network corresponding to the facility, a short-range wireless connection with one or more location devices 400, and/or the like). In such embodiments, the mobile computing entity 105 may be configured to determine its own location relative to one or more location devices 400 within the facility, and to generate an indicator of its own location within the received map information/data. As yet another alternative, the mobile computing entity 105 may be configured to transmit information/data indicative of its current location (as determined based on a location of nearby location devices 400) to the mapping computing entity 110, which may be configured to incorporate an indication of the location of the mobile computing entity 105 into the map information/data before transmitting the same to the mobile computing entity 105.

In certain embodiments, the mapping computing entity 110 may be configured to provide at least a portion of the map information/data to a mobile computing entity 105 via one or more location devices 400 located near the mobile computing entity 105. Accordingly, the location devices 400 utilized to transmit map information/data to the mobile computing entity 105 may be configured to update the map information/data received from the mapping computing entity 110 to incorporate information/data indicative of its own location prior to transmitting the updated map information/data to the mobile computing entity 105. Accordingly, once received by the mobile computing entity 105, the map information/data comprises an indication of the location of the mobile computing entity 105 based on the location of a nearby location device 400 from which the map information/data is received. As discussed herein, the location device 400 may be configured to transmit the map information/data (and/or other data) to the mobile computing entity 105 via wireless communication protocols, such as short range Bluetooth, short range Wi-Fi, NFC, and/or the like.

In various embodiments, the mapping computing entity 110 may enable computing entities located outside of a facility to access the map information/data for a particular facility. For example, the mapping computing entity 110 may be configured to publish the map information/data via the Internet, thereby enabling computing entities (e.g., user computing entities) located outside of the facility to access one or more portions of the map information/data.

Moreover, as discussed herein, the map information/data may be stored on one or more third party mapping computing entities 110 located geographically remotely from the facility. In such embodiments, a computing system located within the facility may be configured to rely on map information/data from the third party mapping computing entities 110 to the mobile computing entities 105, and/or the mobile computing entities 105 may be configured to receive the map information/data directly from the third party mapping computing entities 110. In various embodiments, the third party mapping computing entities 110 may be configured to automatically determine the location of the mobile computing entity (e.g., based on information/data provided by the mobile computing entity) prior to providing the map information/data to the mobile computing entity 105. For example, the third-party mapping computing system 110 may be configured to transmit map information/data for a particular facility to a mobile computing entity upon determining that the mobile computing entity 105 is located within the facility. In various embodiments, the third party mapping computing entity 110 may comprise map information/data for a plurality of facilities, and may be configured to identify appropriate map information/data to provide to a mobile computing entity 105 based at least in part on the location of the mobile computing entity 105.

Moreover, in embodiments in which the map information/data is stored geographically remotely from the facility, the mobile computing entity 105 may be configured to periodically provide the mapping computing entity 110 with updated information/data indicative of the location of the mobile computing entity 105 within the facility such that the mapping computing entity 110 may be configured to update the location of the mobile computing entity 105 within the map information/data. For example, the mobile computing entity 105 may be configured to receive location information/data from a nearby location device 400 (e.g., location information/data identifying the location device 400 broadcast by the location device 400 to the mobile computing entity 105 while the mobile computing entity 105 is located within a communication range corresponding to the location device 400), and to transmit information/data identifying the corresponding location device 400 to the mapping computing entity 110 (e.g., via Wi-Fi, cellular information/data connection, and/or the like). The mapping computing entity 110, upon receipt of the location information/data from the mobile computing entity 105, may update the determined location of the mobile computing entity 105 within the facility. In various embodiments, the mapping computing entity 110 may be configured to transmit updated map information/data back to the mobile computing entity 105 to reflect the updated location of the mobile computing entity 105 within the facility.

In various embodiments, the mobile computing entity 105 may be required to have a specific software application installed thereon and configured to parse the received map information/data. However, in certain embodiments, it should be understood that the mobile computing entity 105 may not be required to have specific software applications installed thereon. In various embodiments, the specific software applications may comprise mapping software. For example, the mapping software may be specific to indoor navigation, may be configured for both outdoor (e.g., GPS-based) navigation and indoor navigation, and/or the like. In certain embodiments, the map information/data may be configured to be viewable via an interface, such as an Internet browser—e.g., Safari® browser, Google Chrome, Internet Explorer, Firefox, Opera, Netscape Navigator, and/or the like.

Figure 4:
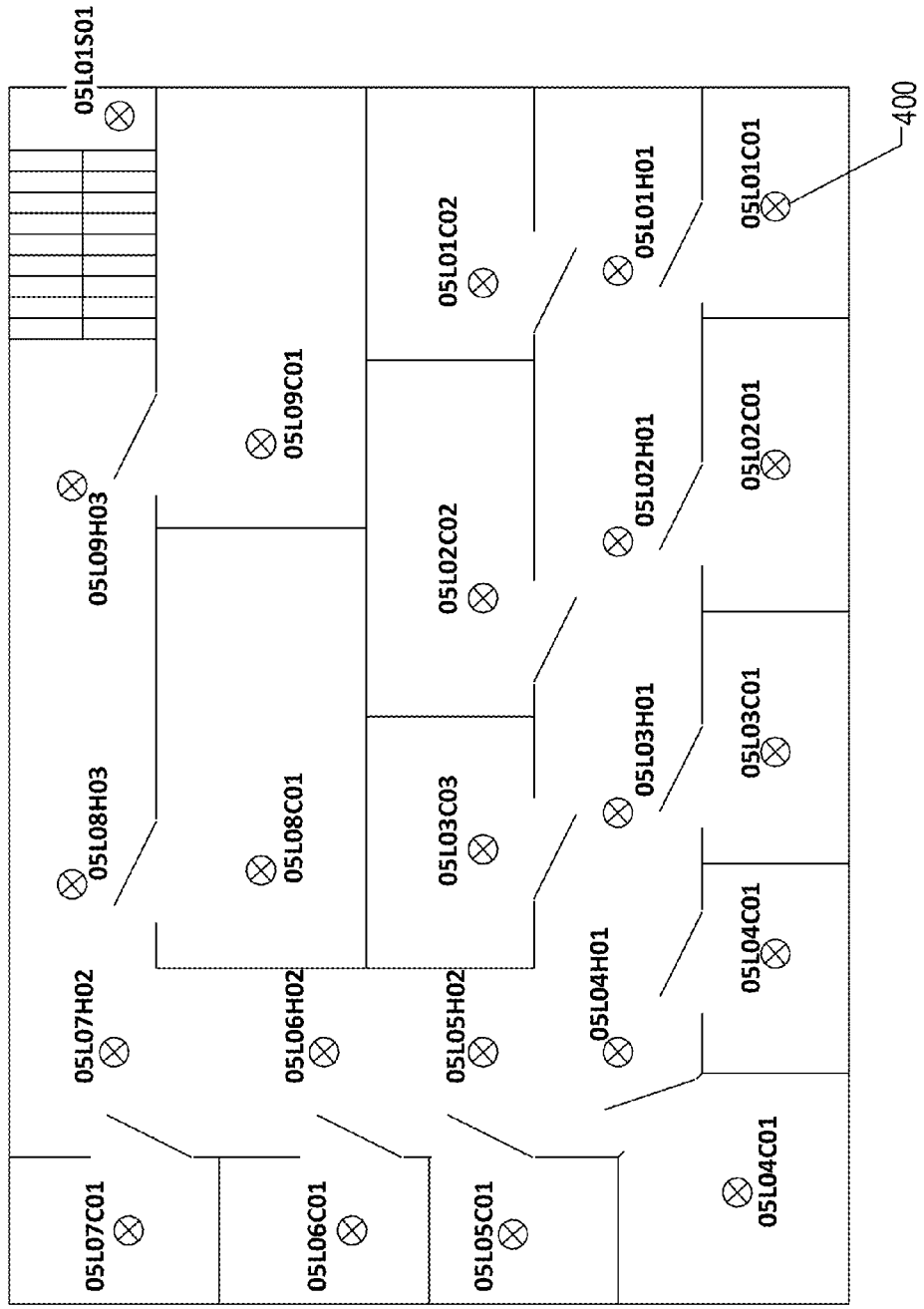
FIG. 4 shows an example interior map indicating locations of various location devices.

The map information/data may comprise information/data usable by the mobile computing entity to generate a graphical display showing an interior map of the facility. For example, the graphical display may comprise a three-dimensional graphical display indicative of distance and altitude within the facility, and/or one or more two-dimensional graphical displays each indicative of a single altitude (e.g., floor) within a facility. An example map display is shown in FIG. 4. As shown in FIG. 4, the map display may identify the location of various location devices 400, the location of a mobile computing entity 105, the location of various destinations, the address of various locations, and/or the like.

In various embodiments, the location of one or more mobile computing entities 105 may be monitored within a facility, and the current location of a particular mobile computing entity 105 may be correlated with a particular interior address. Thus, for example, the location of residents, employees, and/or the like within the building may be monitored and associated with particular indoor addresses based on the location of mobile computing entities 105 associated with each mobile device user. By monitoring the current location of a particular mobile device user within a facility, a computing entity (e.g., mobile computing entity 105 and/or mapping computing entity 110) may determine an appropriate route to reach the current location of a particular mobile device user within a facility.

B. Internal Routing

Figure 6:
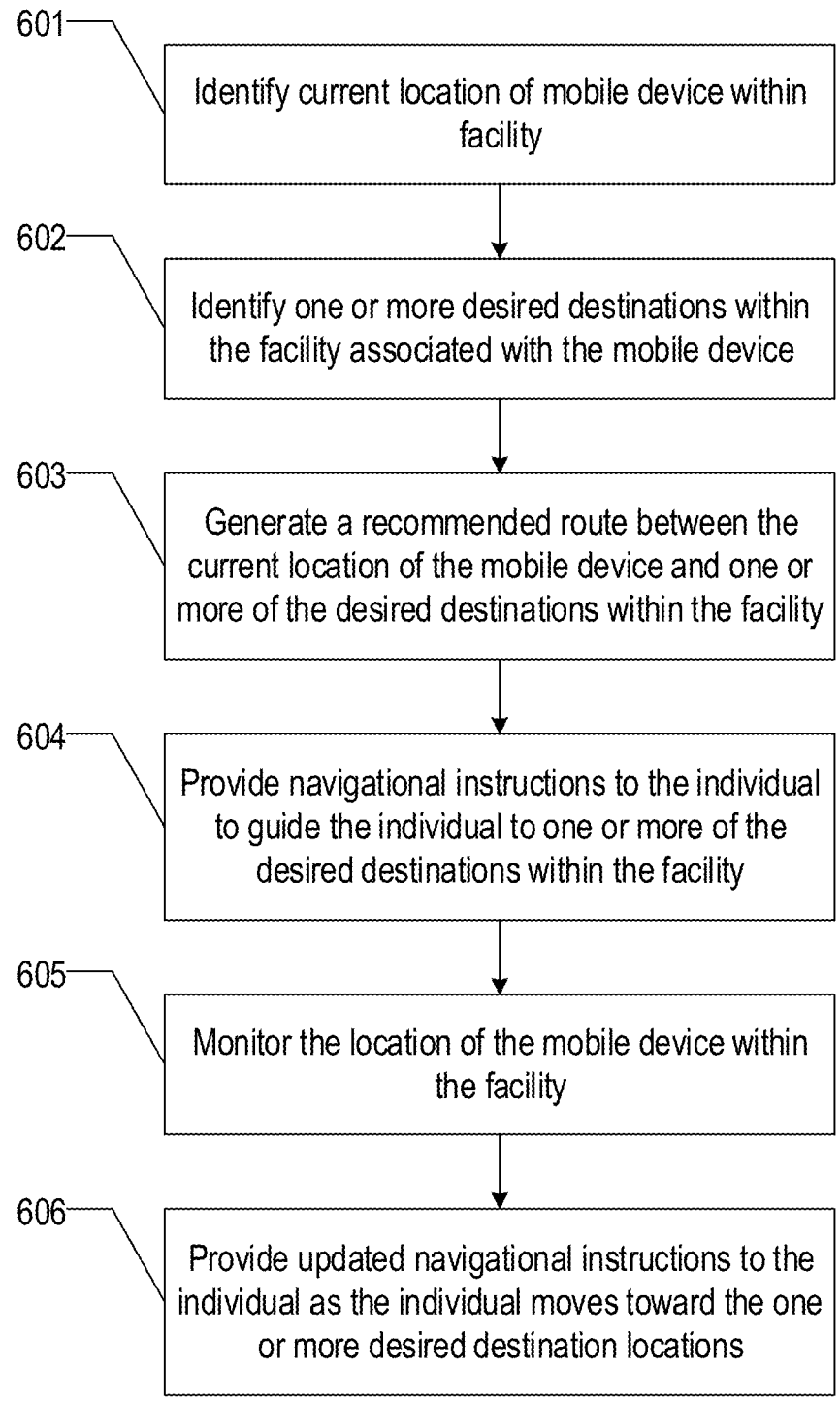
FIG. 6 is a flow chart showing an example method for providing navigational instructions to a user within a facility.

In various embodiments, the one or more internal addresses may be utilized for defining a route between a particular location (e.g., a current location of a visitor or other user) and a desired interior address. As noted above, the internal addresses may be correlated with map information/data (e.g., comprising a blueprint and/or other internal layout providing information/data indicative of the locational relationships between various internal locations within the facility). Accordingly, various embodiments may be configured to calculate one or more routes between the current location of a mobile device user and a desired destination address within the facility. In various embodiments, navigational instructions may then be provided to a mobile device user to guide the user to the desired destination location. As shown in FIG. 6, which illustrates a flow chart of an example method for generating and providing navigational instructions for a user moving within a facility, the recommended route utilized to generate the navigational instructions may be generated for a particular user (e.g., associated with one or more mobile devices) and may be provided to the user to guide the user to the desired destination.

1. Generating a Recommended Route

In various embodiments, one or more computing entities (e.g., mobile computing entity 105 and/or mapping computing entity 110) may be configured to determine a recommended route between a current location of a mobile device user (e.g., identified based at least in part on a determined location of a mobile device, such as a mobile computing entity 105 associated with the user, a connected shipment/item to be delivered within the facility, a vehicle 100, and/or the like) and a desired destination of the user.

In various embodiments, the computing entity (e.g., mobile computing entity 105 and/or mapping computing entity 110) may receive information/data indicative of a current location of a device (e.g., mobile computing entity 105, connected shipment/item, vehicle 100, and/or the like) within a facility, and/or additional information about the facility, such as facility systems (e.g., environmental systems, transport systems, crowd control systems, and/or the like) as shown at Block 601 of FIG. 6. As discussed herein, the location of a device within a facility may be determined based on the identity of location devices 400 determined to be nearby the device (e.g., based on an estimated wireless communication link between the mobile computing entity 105 and one or more location devices 400). Moreover, the computing entity (e.g., mobile computing entity 105 and/or mapping computing entity 110) may receive information/data identifying a desired destination for the mobile device user, as shown at Block 602 of FIG. 6. In various embodiments, a desired destination address may be identified by a corresponding destination address (e.g., a character string corresponding to the internal address of the destination location); a name associated with a particular location (e.g., John Smith's office; 15$^{th}$ floor conference room; Reception; and/or the like); a mobile device user's name (e.g., John Smith); and/or the like. Accordingly, the mobile computing entity 105 may be configured to accept a free-form text input indicative of the destination location, a user selection of one or more listed locations, a scanned destination location (e.g., a delivery destination for a shipment/item), transmitted destination location from a connected shipment/item, and/or the like. For example, a mobile computing entity 105 may receive user input identifying a desired destination location, and the mobile computing entity 105 may utilize the received user input to identify the location of the desired destination address, and/or the mobile computing entity 105 may transmit information/data indicative of the desired destination to a mapping computing entity 110 to identify a recommended route. As yet other examples, a connected shipment/item may transmit information/data indicative of an intended consignee/destination for the shipment/item to the computing entity (e.g., mobile computing entity 105 and/or mapping computing entity 110), which may utilize the intended consignee/destination as the desired destination.

In various embodiments, a desired destination address within the facility may be identified based on information/data stored within the mobile computing entity 105. For example, the mobile computing entity 105 may be configured to utilize information/data indicative of scheduled tasks, meetings, scheduled deliveries of shipments/items, and/or the like occurring at defined locations within the facility to identify a desired destination address. For a particular entry (e.g., calendar entry) stored within the mobile computing entity 105, a start time for an event corresponding to the particular entry and a location corresponding to the event may be identified. The mobile computing entity 105 may be configured to compare the start time for the event against the current time, and may be configured to identify the location for the event as the desired destination address if the start time for the event is less than a configurable threshold amount of time from the current time. As a non-limiting example, upon identifying information/data stored within the mobile computing entity 105 identifying an event occurring less than 15 minutes in the future, the mobile computing entity 105 may be configured to automatically identify the location of the event as a desired destination location.

Moreover, the computing entity (e.g., mobile computing entity 105 and/or mapping computing entity 110) may receive information/data indicative of multiple desired destinations and/or one or more waypoints the mobile device user would like to visit prior to arriving at a desired destination. In various embodiments, the computing entity (e.g., mobile computing entity 105 and/or mapping computing entity 110) may be configured to determine a most efficient order to visit the plurality of desired destinations and/or waypoints based on one or more configurable characteristics, such as the relative locations of the various desired destinations and/or waypoints, deadlines for arriving at the various destinations and/or waypoints, and/or the like. For example, a mobile computing entity 105 may store information/data indicative of a plurality of shipment/item deliveries for a particular facility, each of which may be identified as a particular waypoint within a facility. In such embodiments, the computing entity (e.g., mapping computing entity 110 and/or mobile computing entity 105) may be configured to determine a most efficient route within the facility for delivering the shipments/items, and may generate a route between each of the plurality of shipment/item delivery destinations.

As yet other examples, a destination internal location may be identified based on a desired internal delivery location for an item. In various embodiments, the desired internal delivery location for the item may be identified based on user input identifying the desired internal delivery location received by the mobile computing entity 105, based on computer-readable information/data printed on the item (e.g., a bar code, MaxiCode, QR code, RFID tag, and/or the like) and received by the mobile computing entity 105 (e.g., via scanning the computer-readable information/data from the item); based on information/data transmitted from the item to a computing entity (e.g., mobile computing entity 105, location devices 400, and/or mapping computing entity 110); based on information/data transmitted from a third-party computing entity (e.g., a carrier-operated computing entity); based on information/data stored within the mobile computing entity 105, and/or the like.

In such embodiments, a desired internal delivery location may be identified as a specific internal address; as an identifier associated with a specific internal address (e.g., John Smith's office); as an identity of an intended recipient; and or the like. For example, one or more computing entities (e.g., mobile computing entity 105 and/or mapping computing entity 110) may be configured to identify an internal location associated with the intended recipient (e.g., based on a static and/or dynamic directory comprising information/data identifying one or more locations corresponding to one or more occupants of a serviceable point). In various embodiments, an internal destination location corresponding to the intended recipient may be a static location (e.g., the intended recipient's cubicle, desk, office, apartment, and/or the like) and/or a dynamic location (e.g., determined based on a monitored current location of an intended recipient's mobile computing entity).

As yet another methodology for identifying desired internal destination locations, various embodiments may monitor the locations of one or more users (e.g., based on the determined location of a mobile computing entity carried by the user), and may determine typical internal locations associated with the user and/or typical times (and/or ranges) at which the user moves to one or more locations. The mobile computing entity 105 and/or mapping computing entity 110 may be configured to collect and store location information/data indicative of a corresponding user's location within the facility over time. Based at least in part on the collected and stored location information/data for a particular mobile device user, the mobile computing entity 105 and/or mapping computing entity 110 may be configured to identify times at which a particular user is positioned at a particular location within the facility. For example, the computing entity may be configured to determine that a particular mobile device user is located in a particular office between 8 AM and 12 PM, in a lunch room between 12 PM and 1 PM, and in the same office between 1 PM and 5 PM. Thus, the computing entity may be configured to identify the office as the destination location when the mobile device user first arrives at the facility at approximately 8 AM, the lunch room as the destination location at approximately noon, and the office as the destination location at approximately 1 PM. Accordingly, various embodiments may be configured to automatically determine destination locations for one or more users based on historical information/data indicative of typical locations and/or time periods associated with one or more users.

In various embodiments, a computing entity (e.g., mapping computing entity 110 and/or mobile computing entity 105) may be configured to identify a desired destination location based on information/data identifying a mobile device user, a title, a service, and/or the like. For example, a mobile device user may identify "John Smith" as a desired destination location. As yet other examples, the mobile device user may identify "television salesman," "masseuse," "parts department," "IT support," and/or the like as a desired destination. Based on the provided input identifying a particular desired destination, the computing entity (e.g., mapping computing entity 110 and/or mobile computing entity 105) may be configured to determine whether the desired destination location is associated with a particular stationary location (e.g., a location associated with a corresponding stationary location device 400), a mobile location (e.g., a mobile computing entity 105 identifying the current location of a particular mobile device user), and/or the like. For example, identifying a mobile device user (e.g., John Smith) as a destination location may cause a computing entity (e.g., mapping computing entity 110 and/or mobile computing entity 105) to determine whether the corresponding destination is a stationary location (e.g., John Smith's office) or a mobile destination (e.g., the current location of John Smith's mobile computing entity). In various embodiments, the determination of whether a particular destination location is a stationary location or a mobile location may be determined based on user preferences (e.g., the preferences of the mobile device user associated with a prospective destination). For example, a mobile device user may provide user input indicative of whether the mobile device user's office or the mobile device user's current location should be utilized as a destination location.

In various embodiments, other serviceable point occupants and/or individuals may be enabled to designate a desired destination location for various users. For example, maintenance personnel and/or security personnel may be provided with desired internal destination locations based on information/data indicating one or more users located within a serviceable point requests the presence of the maintenance personnel and/or security personnel. In such embodiments, the user (e.g., a building occupant) requesting the presence of another user (e.g., maintenance and/or security personnel) may be enabled to designate a desired internal destination location (e.g., based on user input) and/or the desired internal destination location may be automatically indicated to be the current location of the user requesting another user's presence.

Moreover, in various embodiments, the computing entity (e.g., mapping computing entity 110 and/or mobile computing entity 105) may be configured to collect and/or store historical information/data indicative of an average amount of time to travel through various portions of a facility at various times. The computing entity may be configured to monitor the movement of one or more mobile computing entities 105 within the facility (e.g., by monitoring which location devices 400 are in communication with various mobile computing entities 105 and the amount of time that the location devices 400 are in communication with the mobile computing entities 105; and/or by receiving information/data from the mobile computing entities 105 indicative of their movement throughout the facility). The computing entity (e.g., mapping computing entity 110 and/or mobile computing entity 105) may be configured to store the historical information/data collected as a result of the monitoring of the mobile computing entity 105 movement and may determine, based on the historical data, an average amount of time to move through various portions of the facility at one or more times. For example, the mapping computing system may be configured to generate information/data indicative of an average amount of time to move from John Smith's office to a parking facility at 5 PM on Wednesdays. In various embodiments, the historical information/data and the generated information/data indicative of an amount of time to move between portions of the facility may be specific to one or more mobile device user (e.g., John Smith) and/or may be applicable to a plurality of mobile device user (e.g., the amount of time to move from an elevator lobby on the fifth floor of a building to the elevator lobby on a first floor of the building). In various embodiments, the mapping computing entity 110 may be configured to monitor the amount of time to move between various areas of a facility along a plurality of routes. Accordingly, the mapping computing entity 110 may be configured to identify a fastest and/or shortest route between points within a facility. Accordingly, the mapping computing entity 110 may be configured to utilize the historical information/data to select a fastest (e.g., least travel time) route between a current location of a mobile device user and a desired destination.

The historical information/data may be generated based on monitoring various mobile computing entities 110 moving throughout the facility. The mapping computing entity 110 may be configured to collect information/data indicative of various mobile computing entities 105 traveling throughout the facility over time, and to generate information/data indicative of an average travel time between various locations within the facility at various times (e.g., 2:00 PM on Wednesday).

Based at least in part on the current location of a mobile computing entity 105, a desired destination location, and/or the historical data, the computing entity (e.g., mapping computing entity 110 and/or mobile computing entity 105) may be configured to generate a recommended route between the current location of the mobile computing entity 105 and the desired destination location as indicated at Block 603 of FIG. 6. In various embodiments, the recommended route may be dynamically determined, such that the recommended route may change if the mobile computing entity 105 is determined to move off of the recommended route, or if the desired destination location is changed.

2. Providing Navigational Instructions to Mobile Device Users

Upon generating a recommended route for a mobile device user, the computing entity (e.g., mobile computing entity 105 and/or mapping computing entity 110) may provide navigational instructions to the mobile device user to guide the user along the recommended route toward the desired destination location, as shown in Block 604 of FIG. 6. The location of the user may be monitored (as shown at Block 605) to ensure the provided navigational instructions remain accurate. As a user moves through the facility, updated navigational instructions may be provided to the user (e.g., to the user's mobile computing entity and/or via one or more location devices 400) to reflect updated instructions to reach the destination.

The navigational instructions may be provided to and/or generated by the mobile computing entity 105, may be provided via one or more location devices 400, and/or the like. The following subsections provide example configurations for providing navigational instructions to users, and should not be construed as limiting.

a. Navigational Instructions Provided by Facility-Specific Mapping Computing Entity In various embodiments, a facility-specific mapping computing entity 110 may be configured to provide navigational instructions for a mobile device user. For example, a mapping computing entity 110 configured to provide mapping services for a particular facility (e.g., storing map information/data for the particular facility and being in direct communication with one or more facility-specific computing entities) may be configured to provide navigational instructions to mobile device user upon generation of a recommended route for the user.

In such embodiments, the facility-specific mapping computing entity 110 may be configured to generate a recommended route for the mobile device user upon receipt of information/data identifying a current location of the mobile device user (e.g., the current location of a mobile computing entity carried by the user, the current location of a shipment/item to be delivered within the facility, and/or the like) and a desired destination for the mobile device user (for example, according to the methodology discussed herein). The facility-specific mapping computing entity 110 may be configured to be in direct communication with the mobile computing entity 105 (or another device, such as a connected shipment/item), in order to receive information/data indicative of the current location of the mobile computing entity 105 and/or information/data indicative of the desired destination of the mobile device user; or the facility-specific mapping computing entity 110 may be configured to be in communication with the mobile computing entity 105 via one or more relays (e.g., location devices 400).

In certain embodiments, the mobile computing entity 105 (and/or other device, such as a connected shipment/item) may be configured to self-determine its location within the facility, and to provide information/data indicative of its current location to the facility-specific mapping computing entity 110 together with information/data identifying the mobile computing entity 105. For example, the mobile computing entity 105 may be configured to receive transmitted information/data from a nearby location device 400 providing information/data indicative of the location of the location device 400. The mobile computing entity 105 may be configured to determine that the location information/data received from the nearby location device 400 is indicative of the current location of the mobile computing entity 105. As yet another example, the mobile computing entity 105 may be configured to determine its own location using any of a variety of other technologies (e.g., triangulation based on signals received from a plurality of information/data communication devices, GPS, and/or the like).

The mobile computing entity 105 may be configured to transmit information/data to the facility-specific mapping computing entity 110 indicative of the current location of the mobile device (e.g., on an information/data transmission channel different from that between the location device 400 and the mobile computing entity 105). The mobile computing entity 105 may be configured to transmit information/data indicative of a desired destination location to the facility-specific mapping computing entity 110 together with the information/data identifying the current location of the mobile computing entity 105 and/or in a separate information/data transmission.

In various embodiments, the mobile computing entity 105 may transmit information/data indicative of a desired destination to the facility-specific mapping computing entity 110 via one or more location devices 400 configured to indicate the current location of the mobile computing entity 105 based on the known location of the transmitting location device 400. In such embodiments, the mobile computing entity 105 may be configured to transmit information/data indicative of a desired destination and information/data indicative of the identity of the mobile computing entity 105 to a proximate location device 400. The location device 400 may relay at least a portion of the received information/data to the facility-specific mapping computing entity 110 and may additionally transmit the current location of the mobile computing entity 105 to the mapping computing entity 110.

As discussed herein, upon receipt of information/data identifying the desired destination location, the facility-specific mapping computing entity 110 may identify a recommended route to the desired destination location (e.g., based on current time, distance, and/or the like). The mapping computing entity 110 may additionally generate navigational instructions (e.g., route-based instructions, such as indications regarding when to turn, how far to travel, and/or the like) and may provide the navigational instructions to the mobile device user.

In certain embodiments, the mapping computing entity 110 may transmit (e.g., directly and/or through one or more relays) map information/data together with information/data identifying the recommended route to the mobile computing entity 105, such that the mobile computing entity may display the navigational instructions for the mobile device user. The mobile computing entity 105 may provide turn-by-turn navigational instructions (e.g., via a display and/or via audible instructions) to the mobile device user. For example, the mobile computing entity 105 may display at least a portion of a map on a display, with overlaid navigational instructions to the mobile device user.

In various embodiments, the mapping computing entity 110 may transmit signals to one or more location devices 400 to cause the location devices 400 to emit navigational cues (e.g., light, sound, displayed information, haptic feedback, taptic feedback, artificial intelligence, and/or the like) indicative of the navigational instructions for the mobile device user. For example, the mapping computing entity 110 may transmit signals to one or more location devices 400 satisfying configurable characteristics. For example, the mapping computing entity 110 may transmit signals to location devices 400 within a configurable distance of the mobile computing entity 105 (e.g., 20 feet) and along the recommended route; to all location devices 400 along the recommended route (e.g., all location devices 400 that are likely to be in communication with the mobile computing entity 105 for at least a period of time while the mobile device user travels to the desired destination); to a configurable number of location devices 400 located along the recommended route and substantially adjacent the current location of the mobile computing entity 105 (e.g., the nearest 5 location devices 400 along the recommended route); to location devices 400 of a particular type (e.g., light fixtures) along at least a portion of the recommended route; and/or the like.

In various embodiments, the location devices 400 receiving signals to generate navigational cues may be identified based at least in part on the identified current location of a mobile computing entity 105. In such embodiments, as the mobile computing entity 105 moves within the facility, location devices 400 identified to generate navigational cues may be dynamically selected such that location devices 400 near a monitored current location of a mobile computing entity 105 are utilized to provide navigational cues to the mobile device user associated with the mobile computing entity 105.

As yet another example, at least a portion of the location devices 400 located along the recommended route (e.g., all location devices 400 located along the recommended route) may receive signals that cause the location devices 400 to emit navigational cues when a mobile computing entity 105 (and/or another device) is detected to be proximate the location device 400. For example, the mobile computing entity 105 may broadcast a unique wireless communication (e.g., via radio transmission, light transmission, and/or sound transmission) that is detectable by proximate location devices 400. Once the location devices 400 receive the unique transmission, the location devices 400 may be configured to emit navigational cues for the mobile device user.

As a specific example, when a mobile device user (with an associated mobile computing entity 105) first enters a facility, a location device 400 proximate the facility entry may detect the presence of the mobile computing entity 105 as discussed herein (e.g., the location device 400 may establish a wireless communication with the mobile computing entity 105 while the mobile computing entity 105 is within a communication range associated with the location device 400). The location device 400 may transmit information/data to a mapping computing entity 110 identifying itself (e.g., the identity and/or location of the location device 400) and identifying the mobile computing entity 105. As discussed herein, the location device 400 may also act as a relay to transmit information/data identifying a desired destination from the mobile computing entity 105 to the mapping computing entity 110. As the mobile computing entity 105 moves within the facility, the location device 400 may handoff communications with the mobile computing entity 105 to a second location device 400. Once the mobile computing entity 105 is in communication with the second location device 400, the second location device 400 may transmit information/data identifying itself and information/data identifying the mobile computing entity 105 to the mapping computing entity 110. Accordingly, the mapping computing entity 110 may thereby be configured to monitor the location of the mobile computing entity 105 within the facility. In those embodiments in which the mapping computing entity 110 selects location devices 400 to emit navigational cues based on the determined location of the mobile computing entity 105, the mapping computing entity 110 may transmit signals to one or more location devices 400 causing those location devices 400 to emit navigational cues based on the determined location of the mobile computing entity 105. For example, the mapping computing entity 110 may identify those location devices 400 located along the recommended route (after such is determined), and meeting one or more criteria based on the determined location of the mobile computing entity 105.

b. Navigational Instructions Provided by Mobile Computing Entity

In various embodiments, the mobile computing entity 105 may be configured to generate and provide navigational instructions to a mobile device user. In such embodiments, the mobile computing entity 105 may be configured to generate a recommended route for the mobile device user upon receipt of information/data identifying a current location of the mobile computing entity 105 and a desired destination for the mobile device user (e.g., based on user input identifying a desired destination location, based on calendar entries stored on the mobile computing entity 105, and/or the like).

In certain embodiments, the mobile computing entity 105 may be configured to self-determine its location within the facility such that the mobile computing entity 105 can determine a recommended route to a desired destination location. For example, the mobile computing entity 105 may be configured to receive transmitted information/data from a nearby location device 400 providing information/data indicative of the location of the location device 400. The mobile computing entity 105 may be configured to determine that the location information/data received from the nearby location device 400 is indicative of the current location of the mobile computing entity 105 and may correlate the location information/data received from the nearby location device 400 with map information/data to identify a current location of the mobile device within the facility. As yet another example, the mobile computing entity 105 may be configured to determine its own location using any of a variety of other technologies (e.g., triangulation based on signals received from a plurality of information/data communication devices, GPS, and/or the like).

As yet another example, one or more location devices 400 may detect the presence of the mobile computing entity 105 as being within a communication range. For example, the mobile computing entity 105 may broadcast information/data indicative of its identity to nearby location devices 400. The location devices 400 may transmit information/data back to the mobile computing entity 105 directly and/or indirectly indicative of the current location of the mobile computing entity 105 within the facility. The location devices 400 may, in certain embodiments, transmit information/data indicative of the identity of the location device 400 and the location of the mobile computing entity 105 to the mapping computing entity 110, which may transmit information/data back to the mobile computing entity 105 indicative of the current location of the mobile computing entity 105.

As discussed herein, upon receipt of information/data identifying the desired destination location, the mobile computing entity 105 may identify a recommended route to the desired destination location (e.g., based on current time, distance, and/or the like). The mobile computing entity 105 may additionally generate navigational instructions (e.g., route-based instructions, such as indications regarding when to turn, how far to travel, and/or the like), and may provide the navigational instructions to the mobile device user. The mobile computing entity 105 may provide turn-by-turn navigational instructions (e.g., via a display and/or via audible instructions) to the mobile device user. For example, the mobile computing entity 105 may display at least a portion of a map on a display, with overlaid navigational instructions to the mobile device user.

In various embodiments, the mapping computing entity 110 may transmit signals to one or more location devices 400 to cause the location devices 400 to emit navigational cues (e.g., light, sound, displayed information, haptic feedback, taptic feedback, artificial intelligence, and/or the like) indicative of the navigational instructions for the mobile device user. For example, the mobile computing entity 105 may be configured to transmit a signal to a location device 400 within a communication range of the mobile computing entity 105 configured to cause one or more location devices 400 to emit navigational cues for the mobile device user. The location device 400 receiving the signal from the mobile computing entity 105 may be configured to relay the signal to a mapping computing entity 110, which may be configured to transmit signals to one or more location devices 400 to emit navigational cues for the mobile device user, as described herein. For example, the mapping computing entity 110 may transmit signals to one or more location devices 400 satisfying configurable characteristics. For example, the mapping computing entity 110 may transmit signals to location devices 400 within a configurable distance of the mobile computing entity 105 (e.g., 20 feet) and along the recommended route; to all location devices 400 along the recommended route (e.g., all location devices 400 that are likely to be in communication with the mobile computing entity 105 for at least a period of time while the mobile device user travels to the desired destination); to a configurable number of location devices 400 located along the recommended route and substantially adjacent the current location of the mobile computing entity 105 (e.g., the nearest 5 location devices 400 along the recommended route); to location devices 400 of a particular type (e.g., light fixtures) along at least a portion of the recommended route; and/or the like.

In various embodiments, the location devices 400 receiving signals to generate navigational cues may be identified based at least in part on the identified current location of a mobile computing entity 105. In such embodiments, as the mobile computing entity 105 moves within the facility, location devices 400 identified to generate navigational cues may be dynamically selected such that location devices 400 near a monitored current location of a mobile computing entity 105 are utilized to provide navigational cues to the mobile device user associated with the mobile computing entity 105.

As yet another example, the mobile computing entity 105 may be configured to transmit a signal to a location device 400 located within a communication range of the mobile computing entity. The receiving location device 400 may be configured to transmit the received signal to one or more additional location devices 400 (e.g., via parallel transmissions from the receiving location device 400 to a plurality of additional location devices 400 and/or via series transmissions from the receiving location device 400 to a second location device 400, which then transmits the signal to a third location device 400, and/or the like). The receiving location device 400 and/or one or more of the additional location devices 400 may thereby receive the transmitted signal and may provide navigational cues for the mobile device user. In various embodiments, the mobile computing entity 105 may be configured to transmit a new signal each time a new location device 400 is within range of the mobile computing entity 105. Accordingly, the identity, number, and/or location of location devices 400 emitting navigational cues may be updated each time the mobile computing entity 105 moves to connect to a new location device 400 within the facility.

As a specific example, when a mobile device user (with an associated mobile computing entity 105) first enters a facility, the mobile computing entity 105 may receive a broadcast signal from a location device 400 proximate the facility entry. The mobile computing entity 105, which may have map information/data for the facility stored thereon, may compare the received signal from the location device 400 against the map information/data to identify its location within the facility. Upon receipt of information/data identifying a desired destination location, the mobile computing entity 105 may generate a recommended route within the facility to the desired destination location. As the mobile computing entity 105 moves within the facility, the mobile computing entity 105 may continuously receive new broadcast location information/data from new nearby location devices 400, and accordingly the mobile computing entity 105 may update the determined current location of the mobile computing entity 105 within the facility. The mobile computing entity 105 may be configured to update the navigational instructions provided to the mobile device user (e.g., by updating the displayed navigational instructions and/or by outputting audible navigational instructions based on the determined current location of the mobile computing entity 105 within the facility.

In various embodiments, the mobile computing entity 105 may be configured to transmit signals to one or more location devices 400 causing the location devices 400 to provide navigational cues for the mobile device user. Accordingly, as the mobile computing entity 105 passes each location device 400 while travelling toward a desired destination location, the mobile computing entity 105 may emit signals to each passed location device 400 causing one or more location devices 400 to emit navigational cues.

c. Navigational Instructions Provided by Third-Party Mapping Computing Entity

In various embodiments, a third-party mapping computing entity 110 may be configured to generate and provide navigational instructions to a mobile device user. In such embodiments, one or more additional computing entities (e.g., mobile computing entity 105 and/or facility-specific mapping computing entity 110) may be configured to transmit information/data indicative of the identity of the facility, the identity of the mobile computing entity 105, the current location of the mobile computing entity 105 within the facility, and/or a desired destination location for the mobile device user to the third-party mapping computing entity 110. Upon receipt of information/data identifying the facility, the mobile computing entity 105, the current location of the mobile computing entity 105, and the desired destination location for the mobile computing entity 105, the third-party mapping computing entity 110 may be configured to generate a recommended route to the desired destination location for the mobile device user. The third-party mapping computing entity 110 may be configured to transmit information/data indicative of the recommended route (and/or map data) to the mobile computing entity 105 and/or the facility-specific mapping computing entity 110 to provide navigational instructions to the mobile device user, as discussed herein. For example, the mobile computing entity 105 may receive the information/data indicative of the recommended route from the third-party mapping computing entity 110 (e.g., via a direct information/data transmission from the third-party mapping computing entity 110 and/or via an indirect information/data transmission from the third-party mapping computing entity 110 and through the facility-specific mapping computing entity 110 and/or one or more location devices 400. As yet another example, the mobile computing entity 105 and/or the facility-specific mapping computing entity 110 may receive information/data indicative of the recommended route from the third-party mapping computing entity and may transmit signals to one or more location devices 400 to cause the location devices 400 to emit navigational cues for the mobile device user.

d. Providing Navigational Instructions Via Location Devices

As discussed herein, one or more location devices 400 may be configured to provide navigational cues to direct a mobile device user along a recommended route to a desired destination within a facility. In various embodiments, the recommended route may be generated by a facility specific mapping computing entity 110, a third party mapping computing entity 110, a mobile computing entity 105, and/or the like. For example, location devices 400 located along at least a portion of a recommended route (e.g., location devices 400 that are likely to be in communication with the mobile computing entity 105 as the mobile computing entity 105 moves along the calculated route) between a determined current location of a mobile computing entity 105 and a desired destination may be configured to emit navigational cues (e.g., light, sound, and/or the like) to direct a particular mobile device user to the desired destination.

For example, various location devices 400 may be configured to emit one or more colored lights to indicate a recommended route to the destination internal address. For example, location devices 400 along a recommended route may illuminate in a first color (e.g., green) to indicate the recommended route to the mobile device user. In various embodiments, the illuminated color may be generic and may apply to all mobile device users, or it may be selected for a particular mobile device user (e.g., a recommended route for a first mobile device user is illuminated with purple location devices 400 and the recommended route for a second mobile device user is illuminated with blue location devices 400).

In various embodiments, one or more location devices 400 may be configured to provide an audible instruction (e.g., a beep and/or a spoken instruction) to the user of the mobile device as the mobile device user moves along the determined route. Moreover, in various embodiments, the location device 400 corresponding to the desired destination internal address may be configured to emit one or more signals (e.g., a second colored light (e.g., yellow) and/or an audible tone) to indicate to the mobile device user the final location of the destination location.

In various embodiments, the location devices 400 may be configured to receive signals from a computing entity (e.g., mapping computing entity 110 and/or mobile computing entity 105) causing the location devices 400 to emit navigational cues. For example, the mapping computing entity 110 may transmit a signal to one or more location devices 400 causing the location devices 400 to emit navigational cues from a mapping computing entity 110 after the mapping computing entity 110 receives a request for navigational instructions from a mobile computing entity 105. As another example, the mobile computing entity 105 may transmit a signal to a first location device 400 located proximate the mobile computing entity 105 (e.g., within a communication range associated with the location device 400) causing at least the first location device 400 to emit a navigational cue for the particular mobile device user. In various embodiments, the first location device 400 may be configured to transmit a signal to a second location device 400 located along the recommended route toward a desired destination location (e.g., as determined by the mobile computing entity 105 and/or the mapping computing entity 110). In response to receipt of the signal from the first location device 400, the second location device 400 may emit a navigational cue.

In various embodiments, location devices 400 along the entire recommended route between a particular location (e.g., the current location of the mobile computing entity 105 identified when the mobile computing entity 105 requested navigational instructions to a destination location) and the destination location may be configured to emit navigational cues simultaneously. As a specific example, location devices 400 along the entire recommended route may emit light having desired characteristics (e.g., wavelength, flashing frequency, and/or the like) simultaneously to guide the particular mobile device user toward the desired destination. As yet another example, location devices 400 along a portion of the recommended route may be configured to provide navigational cues simultaneously. In various embodiments, a computing entity (e.g., mobile computing entity 105 and/or mapping computing entity 110) may be configured to dynamically update which location devices 400 emit navigational cues based on a dynamically determined current location of the mobile computing entity 105 within the facility. For example, location devices 400 located within a configurable threshold distance of the current location of a mobile computing entity and located between the current location of the mobile computing entity and the desired destination location along the recommended route may receive signals causing the location devices 400 to emit navigational cues. Thus, the location devices 400 emitting navigational cues may change as the particular mobile device user (and the mobile computing entity 105) moves along the recommended route to lead the particular user along the recommended route. In such embodiments, a computing entity (e.g., mobile computing entity 105 and/or mapping computing entity 110) may be configured to transmit a signal to a location device 400 causing the location device 400 to terminate emitting navigational cues upon determining that the mobile computing entity 105 has passed the particular location device 400 (e.g., upon determining that the particular location device 400 is no longer located between the current location of the mobile computing entity 105 and the desired destination).

As a specific example, a mobile device user located at a visitor desk on a first floor of a facility may desire to reach the office of John Smith on the fifth floor of the facility, and may provide user input indicative of the desired destination to a mobile computing entity 105. The mobile computing entity 105 may transmit information/data indicative of the desired destination location to the mapping computing entity 110 corresponding to the facility. The mapping computing entity 110 may determine the location of the mobile device user based on the mobile device user being within a transmission range of a location device 400 located at the visitor's desk, and may calculate a recommended route between the mobile device user's current location at the visitor desk on the first floor to John Smith's office on the fifth floor.

Figure 5:
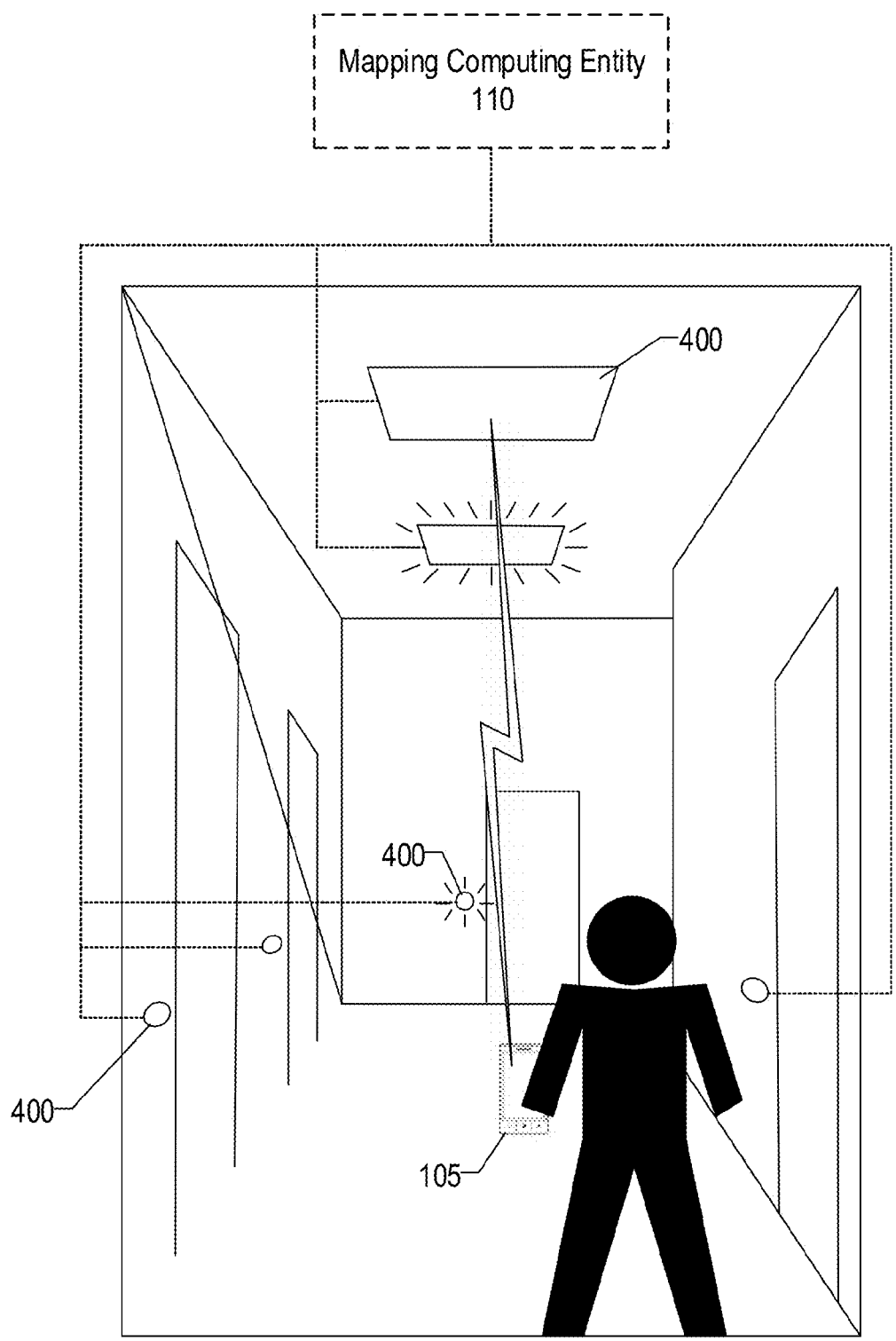
FIG. 5 shows an example beacon activity indicating a determined navigation route within an interior hallway.

Upon identifying a recommended route to John Smith's office, the mapping computing entity may transmit signals to one or more location devices 400 between John Smith's office and the current location of the mobile computing entity 105 (determined to be located at the location device 400 located nearest the location of the mobile computing entity 105) to cause the location devices 400 to indicate the recommended route. For example, the mapping computing entity may transmit signals to all of the location devices 400 located along the recommended travel path, or a subset of the location devices 400 located along the recommended travel path. As just one specific example, the mapping computing entity 110 may be configured to transmit signals to a predetermined number of location devices 400 located between the current location of the mobile computing entity 105 and the desired destination and adjacent the current location of the mobile computing entity 105 (e.g., the three location devices 400 located between the location device 400 identifying the current location of the mobile computing entity 105 and the destination location and immediately adjacent the current location of the mobile computing entity 105). In various embodiments, as the mobile computing entity 105 moves along the recommended path, the first location device 400 indicating the recommended travel path may be configured to stop providing an indication of a recommended travel path once the mobile computing entity enters the transmission range of the location device 400. Moreover, another location device 400 located beyond the last location device 400 providing an indication of the recommended travel path may be configured to begin providing an indication of the recommended travel path, such that the location devices 400 leading the mobile computing entity 105 continue to provide an indication of the recommended travel path. With reference to FIG. 5, which provides a first-person view of a mobile device user traveling along a hallway toward a destination location, the mobile computing entity 105 carried by the mobile device user may communicate with a first, nearest location device 400, while a second location device 400 may illuminate to indicate a recommended direction toward a destination location. Upon reaching the desired destination location, the location device 400 corresponding to the destination location may be configured to indicate the location of the desired destination location. With reference to the previously mentioned example, a location device 400 proximate John Smith's office may illuminate to indicate the destination location to the mobile device user.

C. Transportation Mechanism Operation

Moreover, in various embodiments, the one or more computing entities (e.g., mobile computing entity 105 and/or mapping computing entity 110) may be configured to operate one or more transportation mechanisms (e.g., elevators, escalators, automatic doors, and/or the like) to facilitate movement of a mobile device user within a facility. For example, when a recommended route between a current location of a mobile device user and a desired destination location includes one or more transportation mechanisms (e.g., an elevator), the computing entity may be configured to transmit one or more signals to the transportation mechanism such that the transportation mechanism is available for boarding by the mobile device user when the mobile device user reaches the transportation mechanism, and to automatically direct the transportation mechanism to move the mobile device user to an appropriate location along the recommended route. For example, an elevator may be available and open for a mobile device user when the mobile device user arrives at the elevator bank while moving toward a destination location, and the elevator may automatically move to a desired floor once the mobile device user is in the elevator. An example method for automatically operating one or more transportation mechanisms is illustrated in the flow chart of FIG. 7.

In various embodiments, one or more transportation mechanisms may be configured to receive operating information/data from a mobile computing entity 105 and/or provide information/data to a mobile computing entity 105, internal mapping entity, and/or the like. As discussed herein, the transportation mechanisms may comprise a communication device configured to communicate (e.g., wirelessly) with one or more mobile computing entities 105. The communication device of the transportation mechanisms may be configured to communicate with mobile computing entities 105 within a defined communication range, and accordingly the mobile computing entities 105 may be configured to transmit signals causing the transportation mechanisms to move once the mobile computing entity 105 is within the communication range of the transportation mechanism.

Figure 7:
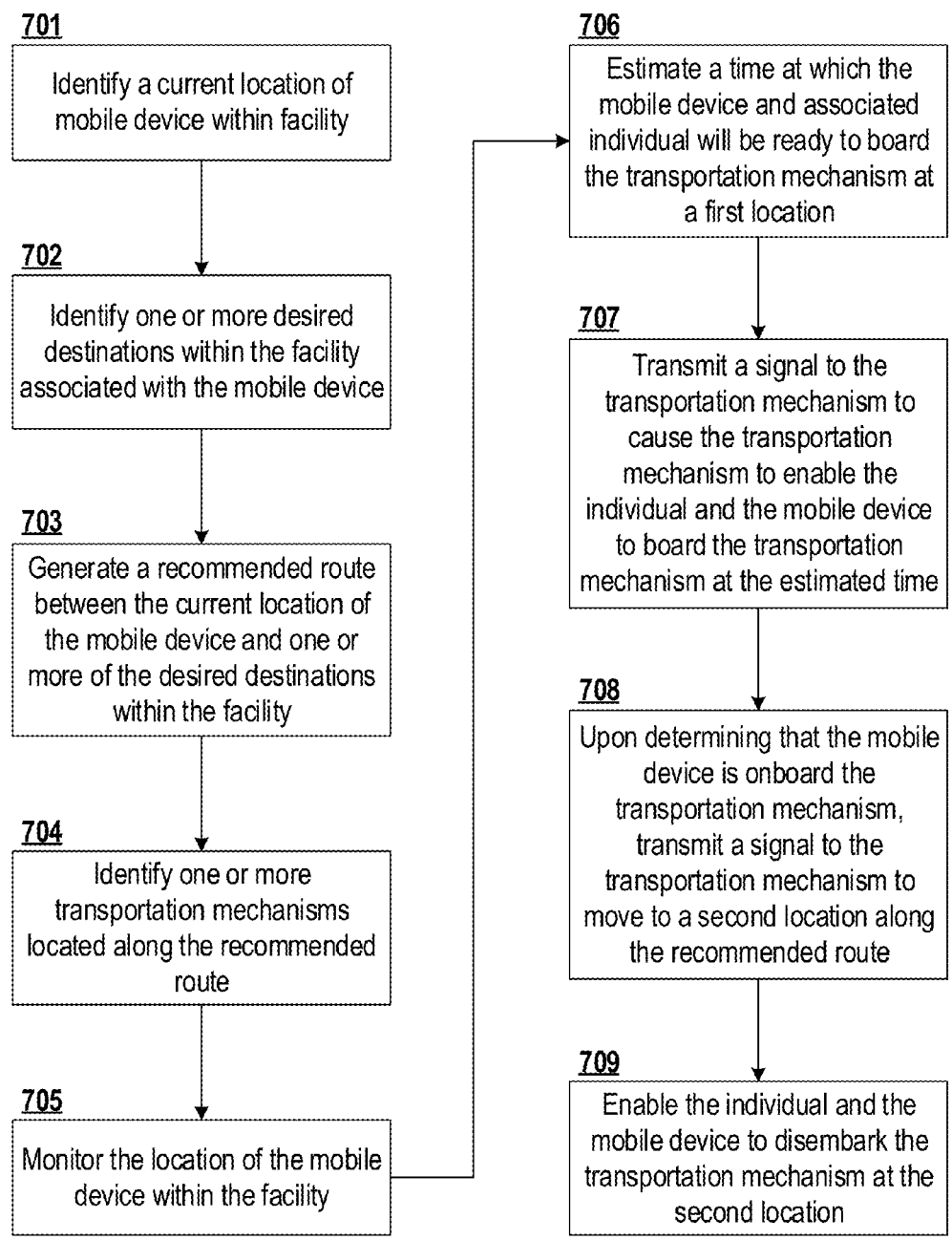
FIG. 7 is a flow chart showing an example method for automatically operating transportation mechanisms to move a user along a recommended route within a facility.

With reference specifically to FIG. 7, one or more transportation mechanisms may be operated to move a user and/or item along a recommended route generated as discussed herein. Accordingly, a computing entity (e.g., mobile computing entity 105 and/or mapping computing entity 110) may receive information/data indicative of a current location of a mobile device (e.g., mobile computing entity 105, shipment/item, vehicle 100, and/or the like) and information/data indicative of a desired destination associated with the mobile device, as indicated at Blocks 701-702. Based at least in part on the information/data indicative of the current location of the mobile device and the information/data indicative of the desired destination associated with the mobile device, the computing entity may generate a recommended route through the facility between the current location and the desired destination of the mobile device, as indicated at Block 703.

Upon generating the recommended route, the computing entity (e.g., mobile computing entity 105 and/or mapping computing entity 110) may identify one or more transportation mechanisms located along the recommended route, as indicated at Block 704. For example, the computing entity may determine that movement from a current location on one floor of a facility to a desired destination on a different floor of the facility may involve travelling in an elevator between floors. The one or more identified transportation mechanisms may be identified as candidates for automated operation as the user and/or item approaches the transportation mechanism. As the mobile device moves along the generated recommended route within the facility, the computing entity monitors the location of the mobile device, as indicated at Block 705. Based on the monitored location of the mobile device, the computing entity estimates an arrival time for the mobile device to arrive at the transportation mechanism, as shown at Block 706. For example, the computing entity may determine an average speed for the mobile device moving along the recommended route and/or a distance to reach the transportation mechanism, and may estimate an amount of time remaining until the mobile device reaches the transportation mechanism. As yet another example, the computing entity may comprise information/data indicative of a geofenced area surrounding the transportation mechanism. In various embodiments, the edge of the geofenced area may be an estimated travel time away from the transportation mechanism (e.g., an estimated amount of time for a determined average user to move from the edge of the geofence to the transportation mechanism), such that the computing entity estimates the time remaining before the mobile device reaches the destination location based on the time at which the mobile device crosses the edge of the geofenced area. As shown in Block 707, the computing entity (e.g., mobile computing entity 105 and/or mapping computing entity 110) may be configured to transmit one or more signals to the transportation mechanism to cause the transportation mechanism to enable the mobile device (and the associated user) to board the transportation mechanism without requiring user input to the transportation mechanism and/or a user interface associated with the transportation interface. For example, as a user approaches an elevator along the recommended route, the computing entity may transmit a signal to the elevator to cause the elevator to move to the current location of the user (e.g., the current floor of the user) if the elevator was not previously located at the current location of the user and to open the elevator doors to enable the user to board the elevator when the user arrives at the elevator.

Upon receiving information/data indicating that the mobile device is onboard the transportation mechanism (e.g., received from the mobile device, the transportation mechanism, one or more location devices 400, and/or the like), the computing entity may be configured to transmit a second signal to the transportation mechanism to cause the transportation mechanism to move to a second location along the recommended route, as indicated at Block 708. Accordingly, upon receipt of the second signal, the transportation mechanism may be configured to close included doors (if applicable) and move to a second specified location along the recommended route. For example, the computing entity may transmit a signal to an elevator causing the elevator to move to a different floor on which the mobile device's destination location is located. Upon reaching the second location at which the mobile device (and associated user) is to disembark the transportation mechanism, the transportation mechanism may be configured to enable the mobile device to disembark (e.g., by opening the doors of the transportation mechanism), as indicated at Block 709. In various embodiments, the transportation mechanism may be configured to automatically enable the mobile device to disembark, however in certain embodiments, the computing entity may be configured to transmit a third signal to the transportation mechanism to enable the mobile device to disembark.

For example, as a mobile device user moves along a recommended route between an initial location (e.g., determined based on the current location of the mobile computing entity 105 when a mobile device user initially requests directions to a desired destination location) and a desired destination location, the mobile computing entity 105 (which may generate and store information/data indicative of the recommended route) may be configured to transmit a signal to a transportation mechanism located along the recommended route causing the transportation mechanism to facilitate the mobile device user's movement toward the desired destination. For example, as the mobile device user approaches an elevator, the mobile computing entity 105 may call the elevator to the mobile device user's initial floor. Once the mobile device user enters the elevator, the mobile computing entity 105 may transmit a second signal causing the elevator to move to a desired floor (e.g., the floor of the desired destination location) to enable the mobile device user to disembark at the desired floor. In various embodiments, the mobile computing entity 105 may be configured to generate and transmit the signals to the transportation mechanism automatically, based on the generated recommended route, and/or the mobile computing entity 105 may be configured to receive user input requesting that a transportation mechanism facilitate movement of a user. For example, the mobile computing entity 105 may receive user input requesting an elevator at a current location of the mobile device user (e.g., the current floor of the mobile device user) and/or requesting that the elevator move the mobile device user to a particular floor. Upon receipt of the user input, the mobile computing entity 105 may transmit one or more signals to the elevator requesting that the elevator move according to the mobile device user's provided instructions.

In certain embodiments, one or more transportation mechanisms may be in communication with a facility-specific mapping computing entity 110 (e.g., directly and/or via a relay, such as one or more location devices 400). Accordingly, the one or more transportation mechanisms may be configured to receive operating information/data from the facility-specific mapping computing entity 110. Moreover, in various embodiments, the one or more transportation mechanisms may be configured to provide operational information/data (e.g., current location of the transportation mechanism, current operating state of the transportation mechanism, and/or the like) to a mobile computing entity 105, mapping computing entity, and/or the like.

For example, as a mobile device user moves along a recommended route between an initial location (e.g., determined based on the current location of the mobile computing entity 105 when a mobile device user initially requests directions to a desired destination location) and a desired destination location, the facility-specific mapping computing entity 110 (which may generate and store information/data indicative of the recommended route) may be configured to transmit a signal to a transportation mechanism located along the recommended route causing the transportation mechanism to facilitate the mobile device user's movement toward the desired destination. For example, as a mobile device user (carrying a mobile computing entity 105) approaches an elevator, the facility-specific mapping computing entity 110 may detect the mobile device user's presence proximate the elevator, and may transmit a signal calling the elevator to the mobile device user's current floor. Once the mobile device user enters the elevator, the facility-specific mapping computing entity 110 may transmit a second signal to the elevator causing the elevator to move to a desired floor (e.g., the floor of the desired destination location) to enable the mobile device user to disembark at the desired floor. In various embodiments, the facility-specific mapping computing entity 110 may be configured to generate and transmit the signals to the transportation mechanism automatically, based on the generated recommended route.

In various embodiments, the facility-specific mapping computing entity 110 may be configured to transmit one or more signals to a transportation mechanism upon determining that a mobile computing entity 105 is within a predefined distance of the particular transportation mechanism. For example, the facility-specific mapping computing entity 110 may be configured to monitor the location of the mobile computing entity 105 moving within the facility (e.g., based on the identity of location device 400 in communication with the mobile computing entity 105). Upon determining that the mobile computing entity 105 is within a predefined distance from the transportation mechanism, the facility-specific mapping computing entity 110 may transmit a signal to the transportation mechanism causing the transportation mechanism to move to the mobile device user's current floor such that the transportation mechanism is available when the mobile device user arrives at the transportation mechanism. In various embodiments, the signal transmitted to the transportation mechanism may comprise information/data indicative of a current location of a mobile device user (e.g., the initial floor) and a desired destination for the transportation mechanism (e.g., a destination floor). In various embodiments, the current location of the mobile device user (e.g., the initial floor) and/or the desired destination for the transportation mechanism (e.g., the destination floor) may be determined based at least in part on a generated recommended route to the desired destination.

Moreover, in various embodiments, the facility-specific mapping computing entity 110 may be configured to monitor a plurality of mobile device users moving within a facility, and to manage transportation mechanism usage based at least in part on forecasted transportation usage based on determined recommended routes for each of a plurality of mobile device users moving within the facility.

For example, the facility-specific mapping computing entity 110 may be configured to assign each forecasted user (e.g., mobile device users) of a transportation mechanism a relative priority value. The facility-specific mapping computing entity 110 may be configured to transmit signals to the transportation mechanism to pick-up a user having a higher relative priority value before picking up a user having a lower relative priority value. In various embodiments, the relative priority values may be assigned based on an identity of a user corresponding to a particular mobile computing entity 105, based on a type of mobile computing entity 105, and/or the like. As a non-limiting example, in a hospital an Emergency Room doctor may have a higher relative priority than a hospital visitor, and accordingly the facility-specific mapping computing entity 110 may be configured to transmit signals to a transportation mechanism such that the ER doctor receives an elevator prior to the hospital visitor, if both mobile device users request the same elevator simultaneously.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Moreover, a particular destination location may be mobile within a particular building and/or campus. For example, a destination location may correspond to the current location of a particular mobile device user (e.g., determined based on the location of a mobile device carried by the mobile device user). In such embodiments, the destination internal address may change. Accordingly, various embodiments may be configured to adjust a route determined between a current location of a user of a particular mobile device and the destination location such that the user of the mobile device intercepts the mobile device user defining the destination location.

Moreover, in various embodiments, computing entities may be configured to generate one or more notifications to various mobile device users, such as a mobile device user defining a destination location, that a particular user has indicated a desire to visit the mobile device user. Accordingly, the generated notification may request that the mobile device user remain within their current area until the visitor reaches the current location of the mobile device user.

In various embodiments, internal navigational guidance may be integrated as a portion of existing navigational systems. For example, an existing navigational system may instruct a user on how to arrive at a desired serviceable point, and the navigational system may then continue guiding the user through the serviceable point to arrive at a particular desired internal location within the serviceable point.

In various embodiments, access to internal routing, internal mapping, and/or internal addressing information/data may be limited to registered users and/or devices. Accordingly, prior to accessing one or more features as discussed herein, various users may be required to generate a user account, register a mobile computing entity (e.g., by installing and/or registering a mobile software application on the mobile computing entity), and/or the like. Upon registering the user and/or the mobile computing entity, additional computing entities (e.g., mapping computing entity) may be configured to verify the registration status of the user and/or the mobile device prior to enabling access to various internal routing, internal mapping, and/or internal addressing features. Moreover, in various embodiments, access to internal routing, internal mapping, and/or internal addressing features corresponding to particular serviceable points may be limited to only a subset of registered users.

That which is claimed:

1. A system for providing internal navigation instructions within a facility, the system comprising:
a computing system comprising at least one computer readable medium and at least one processor, wherein the at least one processor is configured to:
receive, via a communication receiver, location data indicative of a current location of a user;
receive, via the communication receiver, destination data indicative of a desired destination for the user;
generate a recommended route between the current location of the user and the desired destination for the user; and
transmit, via a communication transmitter, one or more signals indicative of at least a portion of the recommended route, wherein each of the one or more signals comprises one or more navigational instructions for the recommended route and each navigational instruction corresponds to a particular location within the facility;
monitor a location of the user as the user moves within the facility to determine the current location of the user; and
one or more of a plurality of location devices each associated with respective locations within the facility and positioned between the current location of the user and the desired destination for the user, each of the one or more of the plurality of location devices are configured to:
receive, via an onboard communication interface, one or more of the transmitted signals from the computing system, the one or more transmitted signals indicating the one or more of the plurality of location devices that will emit a navigational cue based upon the determined current location of the user;
emit one or more navigational cues indicative of a navigational instruction corresponding to the respective location of the location device selected from the one or more navigational instructions of the transmitted signals, wherein the one or more navigational cues are selected from at least one of:
(a) one or more illuminated lights indicating a direction of travel along the recommended route; or
(b) a sound indicating a direction of travel along the recommended route; and
in response to monitoring the location of the user as the user moves within the facility, receive, via an on board communication interface, one or more transmitted signals from the computing system to terminate emitting the one or more navigational cues upon the computer system determining that the user has passed the one or more of the plurality of locations devices emitting the one or more navigational cues.

2. The system of claim 1, wherein the computing system is a mobile computing device.

3. The system of claim 2, wherein receiving location data comprises receiving location data broadcast from a location device indicative of a current location of the location device.

4. The system of claim 1, wherein receiving destination data comprises at least one of:
(a) receiving user input indicative of the desired destination data;
(b) receiving data indicative of a delivery location for an item; or
(c) receiving data indicative of the location of an appointment for the user.

5. The system of claim 1, wherein the computing entity system is a central computing system, and wherein:
receiving location data comprises receiving data indicative of a current location of a mobile computing device associated with the user; and
receiving destination data comprises receiving data indicative of a desired destination for the user from the mobile computing device associated with the user.

6. The system of claim 1, wherein the location data is generated by comparing the current location of the user against the respective locations of one or more of the location devices.

7. The system of claim 6, wherein each of the plurality of location devices are configured to broadcast data indicative of their location, and
wherein a mobile device is configured to receive broadcast data from one or more location devices and to generate the location data based on the received broadcast data.

8. The system of claim 1, wherein transmitting the one or more signals indicative of the recommended route comprises transmitting the one or more signals to a subset of the plurality of location devices, wherein the subset of the plurality of location devices are identified based at least in part on the location data.

9. The system of claim 1, wherein one or more of the plurality of location devices are integrated into light fixtures.

10. A method for providing internal navigation instructions within a facility, the method comprising:
receiving, via a communication receiver of a computing system location data indicative of a current location of a user;

receiving, via the communication receiver of the computing system destination data indicative of a desired destination for the user;

generating, via the computing system a recommended route between the current location of the user and the desired destination for the user;

monitoring, via the computing system, a location of the user as the user moves within the facility to determine the current location of the user; and transmitting, from a communication transmitter of the computing system one or more signals indicative of at least a portion of the recommended route to one or more of a plurality of location devices based upon the determined current location of the user, wherein each of the one or more signals comprises one or more navigational instructions for the recommended route and each navigational instruction corresponds to a particular location within the facility, and wherein the one or more of the plurality of location devices are each associated with respective locations within the facility and are positioned between the current location of the user and the desired destination of the user;

causing the one or more of the plurality of location devices to emit one or more navigational cues indicative of a navigational instruction corresponding to the respective location of the location device selected from the one or more navigational instructions of the transmitted signals, wherein the one or more navigational cues are selected from at least one of:

(a) one or more illuminated lights indicating a direction of travel along the recommended route; or (b) a sound indicating a direction of travel along the recommended route; and in response to monitoring the location of the user as the user moves within the facility, receiving one or more transmitted signals from the computing system to terminate emitting the one or more navigational cues upon the computing system determining that the user has passed the one or more of the plurality of locations devices emitting the one or more navigational cues.

11. The method of claim 10, wherein the computing system is a mobile computing device.

12. The method of claim 10, wherein receiving destination data comprises at least one of:

(a) receiving user input indicative of the desired destination data;

(b) receiving data indicative of a delivery location for a shipment; or (c) receiving data indicative of the location of an appointment for the user.

13. The method of claim 10, wherein the computing entity system is a central computing system, and wherein:

receiving location data comprises receiving data indicative of a current location of a mobile computing device associated with the user; and receiving destination data comprises receiving data indicative of a desired destination for the user from the mobile computing device associated with the user.

14. The method of claim 10, wherein the location data is generated by comparing the current location of the user against the respective locations of one or more of the location devices.

15. The method of claim 10, wherein transmitting the one or more signals indicative of the recommended route comprises transmitting the one or more signals to a subset of the plurality of location devices, wherein the subset of the plurality of location devices are identified based at least in part on the location data.

16. The method of claim 10, wherein the one or more of the plurality of location devices are integrated into light fixtures.

17. The method of claim 10, further wherein determining that the desired destination is one of a stationary location or a mobile location.

18. A computer program product comprising at least one non-transitory computer-readable storage medium having computer-readable program code portions stored therein, the computer-readable program code portions comprising:

an executable portion configured to receive location data indicative of a current location of a user;

an executable portion configured to receive destination data indicative of a desired destination for the user;

an executable portion configured to generate a recommended route between the current location of the user and the desired destination for the user; and an executable portion configured to transmit one or more signals indicative of the recommended route to one or more of a plurality of location devices, wherein each of the one or more signals comprises one or more navigational instructions for the recommended route and each navigational instruction corresponds to a particular location within the facility, and wherein the location devices are each associated with respective locations within the facility and are positioned between the current location of the user and the desired destination of the user;

an executable portion configured to monitor a location of the user as the user moves within the facility to determine the current location of the user; and an executable portion configured to cause the one or more of the plurality of location devices to emit one or more navigational cues indicative of a navigational instruction corresponding to the respective location of the location device selected from the one or more navigational instructions of the transmitted signals, wherein the one or more navigational cues are selected from at least one of:

(a) one or more illuminated lights indicating a direction of travel along the recommended route; or (b) a sound indicating a direction of travel along the recommended route; and an executable portion configured to receive, in response to monitoring the location of the user as the user moves within the facility, one or more transmitted signals to terminate emitting the one or more navigational cues upon a determination that the user has passed the one or more of the plurality of location devices emitting the one or more navigational cues.

* * * * *

UNITED STATES PATENT AND TRADEMARK OFFICE
CERTIFICATE OF CORRECTION

PATENT NO. : 10,129,698 B2
APPLICATION NO. : 15/378515
DATED : November 13, 2018
INVENTOR(S) : Robert J. Gillen et al.

It is certified that error appears in the above-identified patent and that said Letters Patent is hereby corrected as shown below:

In the Specification

Column 29, Line 58: Please remove "and or" and replace with --and/or--.

In the Claims

Column 46, Line 36-37: Please remove "computing entity system" and replace with --computing system--.
Column 47, Line 53-54: Please remove "computing entity system" and replace with --computing system--.

Signed and Sealed this
Fifth Day of February, 2019

Andrei Iancu
*Director of the United States Patent and Trademark Office*